(12) United States Patent
Saito et al.

(10) Patent No.: US 6,301,019 B1
(45) Date of Patent: *Oct. 9, 2001

(54) IMAGE READING APPARATUS, IMAGE READING METHOD, WHITENESS LEVEL CORRECTING METHOD AND WHITENESS LEVEL GENERATING METHOD

(75) Inventors: Keiichi Saito; Norio Kanemitsu; Minoru Wada, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/408,292

(22) Filed: Mar. 22, 1995

(30) Foreign Application Priority Data

Apr. 22, 1994 (JP) .................................................. 6-085068

(51) Int. Cl.⁷ .................................................. H04D 1/38
(52) U.S. Cl. ........................... 358/461; 358/465; 358/521
(58) Field of Search .................... 358/461, 446, 358/447, 405, 506, 518, 521, 530; 355/311, 237

(56) References Cited

U.S. PATENT DOCUMENTS

| | | | |
|---|---|---|---|
| 3,976,833 | 8/1976 | Lavery | 178/7.6 |
| 4,338,020 | * 7/1982 | Yukawa | 355/41 |
| 4,383,275 | 5/1983 | Sasaki et al. | 358/280 |
| 4,554,583 | * 11/1985 | Saitoh et al. | 358/284 |
| 4,622,594 | * 11/1986 | Honjo et al. | 358/293 |
| 4,659,208 | * 4/1987 | Miyazaki et al. | 355/88 |
| 4,806,780 | * 2/1989 | Yamamoto | 358/293 |
| 4,841,376 | * 6/1989 | Yamamoto et al. | 358/282 |
| 4,903,144 | * 2/1990 | Stefanik et al. | 358/461 |
| 5,130,807 | 7/1992 | Tanabe et al. | 358/296 |
| 5,133,022 | * 7/1992 | Weideman | 382/18 |
| 5,200,837 | 4/1993 | Sakurai | 358/401 |
| 5,267,053 | * 11/1993 | Potucek et al. | 358/461 |
| 5,486,903 | * 1/1996 | Kanno et al. | 355/208 |
| 5,568,270 | * 10/1996 | Endo | 358/298 |
| 5,625,718 | * 4/1997 | Kaji | 382/274 |

FOREIGN PATENT DOCUMENTS

| | | | |
|---|---|---|---|
| 3444555A1 | 9/1986 | (DE) | H04N/1/04 |
| 0041319A3 | 12/1981 | (EP) | G06K/7/015 |
| 0093766B1 | * 2/1986 | (EP) | G06K/9/20 |
| 0295588A3 | 6/1988 | (EP) | H04N/1/024 |
| 57104370 | * 6/1982 | (JP) | H04N/1/40 |
| 58125954 | * 7/1983 | (JP) | H04N/1/12 |
| 6085673 | * 5/1985 | (JP) | H04N/1/04 |
| 6278963 | * 4/1987 | (JP) | H04N/1/04 |
| 58202665 | * 11/1993 | (JP) | H04N/1/38 |
| 59229967 | 12/1996 | (JP) | H04N/1/04 |

* cited by examiner

Primary Examiner—Jerome Grant, II
(74) Attorney, Agent, or Firm—Staas & Halsey LLP

(57) ABSTRACT

An image reading apparatus has an automatic document feeder and a flat bed, wherein a backing part which is read so as to ensure that a leading edge of an original is read is configured to have a white area and a gray area, either the white area or the gray area being read depending on a type of the original, and the original being read subsequently.

13 Claims, 20 Drawing Sheets

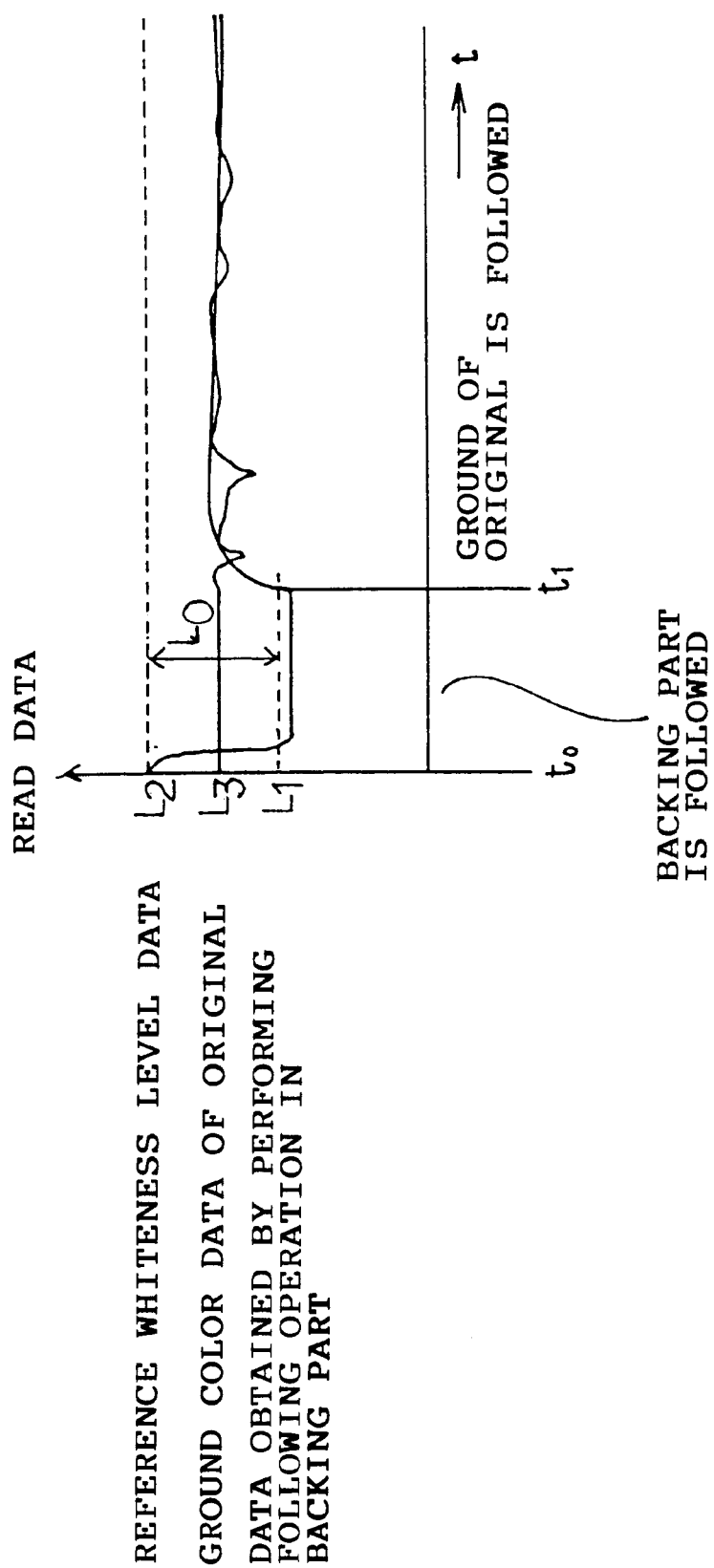

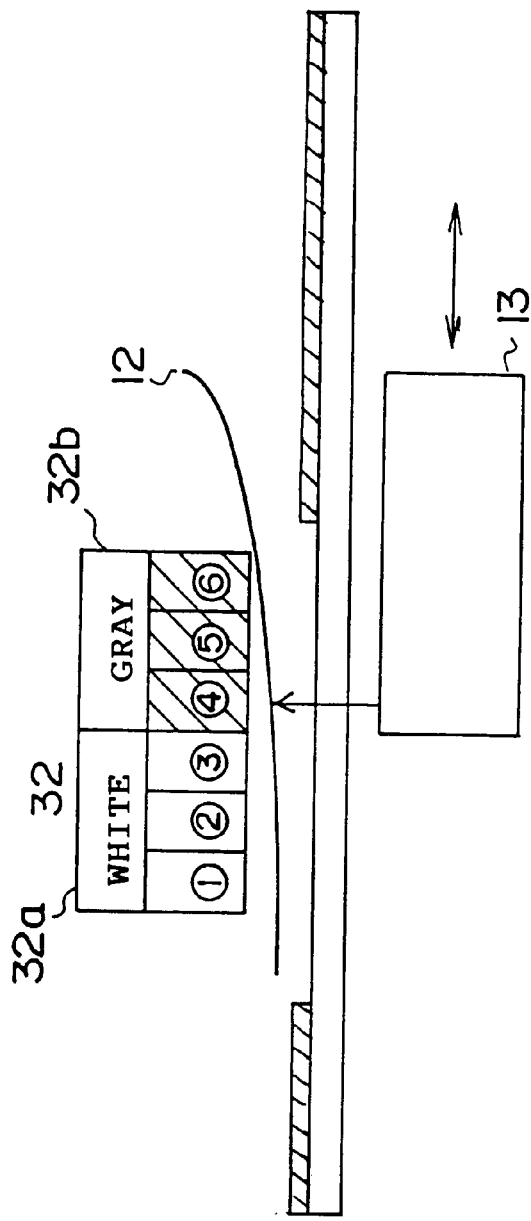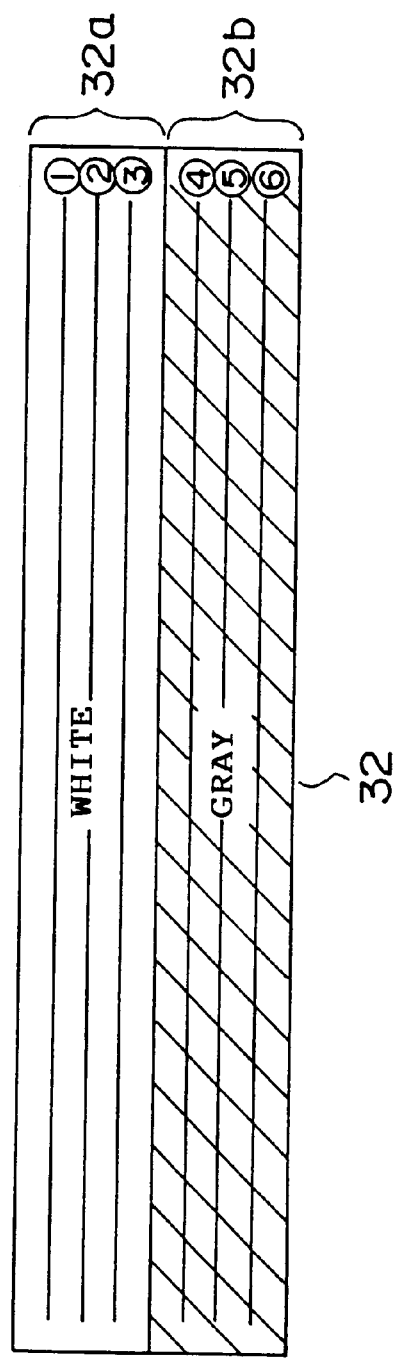
FIG. 9A
FIG. 9B

IMAGE READING APPARATUS, IMAGE READING METHOD, WHITENESS LEVEL CORRECTING METHOD AND WHITENESS LEVEL GENERATING METHOD

BACKGROUND OF THE INVENTION

1. Field of the Invention

The present invention relates to image reading apparatuses, methods of reading images, whiteness level correcting methods and whiteness level generating methods, and more particularly to an image reading apparatus and an image reading method for reading an image on an original, and to a whiteness level correcting method and a whiteness level generating method employed in reading an image on an original.

Recently, with less paper being used in offices, image inputting products (image scanners) have been used as inputting means for storing documents in optical disks or the like. As the volume of images increases, high-speed input systems are used more often. Hence, use of automatic paper feeding is being practiced more and more widely.

In the case where automatic paper feeding is used in image reading, a CCD (charge coupled device) starts a reading operation at a member (hereinafter, referred to as a backing part or a backing member) for supporting the backside of an original so that the leading edge of the original can be read.

Since a reading is started at the backing part, a ground color (reference color) of the original cannot be read properly. In some cases, an image reading apparatus may produce a darkened output. Another problem in a conventional image reading apparatus is that, when a large volume of input originals are processed, the backing part and the input original may undergo friction, resulting in a flaw extending in a longitudinal direction being created in he backing part. When the flaw is created, the output f the image reading apparatus often accompanies a white or black streak.

Thus, an arrangement, whereby it is ensured that the leading edge of an automatically fed original is read, is met by a difficulty in obtaining a high-quality image which is true to the original.

For this reason, there is required an image reading apparatus capable of producing a high-quality image true to the original that is fed automatically.

2. Prior Art

FIG. 1 shows a construction of a conventional image reading apparatus 91. The image reading apparatus 91 has an electrooptical converter 92 for reading an image optically, an image processing unit 93 for processing a signal obtained in the electrooptical converter 92, a feeding mechanism as for transporting an original 94, a carriage driving mechanism 96 for moving the electrooptical converter 92, and a controller 97 for controlling the image processing unit 93, the feeding mechanism 95 and the carriage driving mechanism 96.

The image reading apparatus 91 includes: a flat-bet (FB) function whereby the electrooptical converter 92 is moved by the carriage driving mechanism 96 to scan an original 94 so that the image thereon is read; and an automatic document feeder (ADF) function whereby the image is read while the original 94 is being moved by the feeding mechanism 95 and scanned.

As shown in FIG. 1, if the reading is executed in an FB mode, the controller 97 controls, upon power ON of the apparatus, the carriage driving mechanism 96 so that the electrooptical converter 92 is moved in a direction indicated by an arrow $A_1$ to reach a home position $P_0$ and stand by for an instruction signal. An original cover 98 is opened so that the original 94 is set in a platform 99 for an original. When an instruction to read an image arrives, a fluorescent lamp provided in the electrooptical converter 92 is turned on, whereupon the electrooptical converter 92 is further moved in the $A_1$ direction to reach a position $P_1$ so as to scan a reference plate 100 and read a reference whiteness level. Subsequently, the electrooptical converter 92 scans the original 94 so as to start reading the image thereon at a predetermined position $P_2$. When the reading is completed, the electrooptical converter 92 is returned to the home position $P_0$ and stands by for a next instruction. In reading the original 94, the reference whiteness level is used as an initial value, and other whiteness levels are successively made to follow the initial value. In this way, correction is made so that proper contrast is obtained.

If the reading is executed in an ADF mode, the controller 97 controls, upon power ON of the apparatus, the carriage driving mechanism 96 so that the electrooptical converter 92 is moved in the $A_1$ direction to reach a home position $P_0$ in the left half of the apparatus in FIG. 1 and stands by for an instruction signal. The original 94 is set in a shooter 101. When an instruction to read an image arrives, the fluorescent lamp in the electrooptical converter 92 is turned on, and the electrooptical converter 92 is further moved in the $A_1$ direction to reach the position $P_1$ and read the reference whiteness level of the reference plate 100. Subsequently, the electrooptical converter 92 is moved to an ADF reading position $P_3$ in the left half of the apparatus in FIG. 1 and stands by for an instruction. The feeding mechanism 95 is then driven so as to draw the originals 94 mounted in the shooter 101 one by one into the ADF. Reading is started from a predetermined position. The document 94 read is ejected to a stacker 102.

The original 94 is guided by a backing part 103 so as to face directly opposite the electrooptical converter 92.

FIG. 2 shows a conventional backing part 103. In ADF reading, in order to ensure that a leading edge 94a of the original 94 is read, reading is started before the original 94 is transported to a reading position. The backing part 103 is read first, whereupon the original 94 is transported and read. Conventionally, the entire backing part 103 is painted in white in an assumption that the ground color of a commonly used original 94 is white.

The image processing unit 93 converts an analog electric signal from the electrooptical converter 92 into a digital signal on the basis of the reference whiteness level. In order to prevent data from being ruined by a level of the analog electric signal becoming higher in brightness level than the reference whiteness level, a conventional apparatus is equipped with a circuit whereby the electric signal is compared with the whiteness level required for conversion of the analog electric signal into the digital data. When it is determined that a difference between the analog electric signal and the whiteness level exceeds a predetermined level, the analog electric signal is made to indicate the whiteness level to make sure that the ground color of the original is white. Since image reading is started at the backing part 103 in the ADF, the color (white) of the backing part 103 is read first, whereupon other whiteness levels are made to follow. That is, a white-level following operation is started at the leading edge of the original.

It is to be noted that an original read by an image reading apparatus can be an original characterized by a contrast between the ground color of the original and a line drawing etc. on the original, or an original like a photograph whose image representation does not depend on the ground color.

The original which contains a line drawing etc. does not necessarily have the ground color of white. Hence, in order to obtain optimal contrast, a white-level following operation for determining the whiteness level should be carried out in accordance with a read signal. A reading mode wherein a reading is executed while whiteness levels are made to follow the ground color is referred to as a line art mode.

An image on an original such as a photograph is represented without the ground color being shown. An image true to the original cannot be obtained if a white-level following operation is conducted on an original such as a photograph. In this type of original, an image is read such that the reference whiteness level is determined by employing white as the fixed reference color. An image reading mode wherein the reference whiteness level is determined by employing white as the fixed reference color is referred to as a photograph mode.

Thus, the conventional image reading apparatus is constructed such that an image reading mode (line art mode or photograph mode) adapted for the type of original (a line drawing or a photograph) is chosen for image reading suitable for the original to be carried out.

It is to be noted that, irrespective of whether the line art mode or the photograph mode is employed, there is provided only one (white) backing part in the conventional image reading apparatus. In the line art mode wherein reading (white-level following operation) is started at the backing part in order to ensure that the leading edge of the original is read, the color (white) of the backing part is stored as the ground color of the original, and shading correction is conducted accordingly. There is a problem in that, when the original has a darkened color, a gap is created between the reference white level data and the data for the ground color, with the result that an accurate white-level following operation cannot be performed, and the image becomes darkened.

It is also to be noted that the white-level following operation of an original is conventionally conducted at the backing part or at a leading edge (which has a width of about 3 mm) of the original. A flaw in the backing part may cause the reflectance thereof to vary, with the result that different data may be output even when same reference plate is read. Consequently, reading correction is conducted even when data relating to the ground color vary depending on CCD pixels, with the result that a normal white-level following operation cannot be conducted, and a streak may be created in the image.

SUMMARY OF THE INVENTION

Accordingly, an object of the present invention is to provide an image reading apparatus, an image reading method, a whiteness level correcting method and a whiteness level generating method capable of obtaining a high-quality image true to an original.

Another and more specific object of the present invention is to provide an image reading apparatus comprising:
an electrooptical converter which, provided opposite an original, scans the original and converts reflected light from the original that is illuminated into an electric signal;
a backing member which has differently colored areas arranged in a direction in which the electrooptical converter scans the original, and is provided opposite the electrooptical converter so as to support the back side of the original;
a driving mechanism for moving the electrooptical converter with respect to the backing member; and
controlling means for controlling the driving mechanism in correspondence with a type of the original, and thereby controlling a position of the electrooptical converter with respect to the backing member so that the electrooptical converter faces one of the colored areas of the backing member.

Preferably, the image reading apparatus further comprises:
converting means for converting an analog signal output by the electrooptical converter into digital data in accordance with a whiteness level indicating a maximum brightness; and
a whiteness level following circuit which causes a whiteness level supplied to the converting means to follow the analog electric signal output from the electrooptical converter.

According to the image reading apparatus of the present invention, in an image reading scheme whereby an original is read while a whiteness level is made to approximate the ground color of the original, and a backing part is read first in order to make sure that the leading edge of the original is read, the color of the backing member is selected to be similar to the ground color of the original. With this arrangement, a whiteness level following operation can be properly performed even when the operation is started in the backing member, thus ensuring that an image having an optimum contrast can be reproduced.

In another preferable embodiment, the image reading apparatus comprises:
a driving mechanism for altering a relative position of the electrooptical converter and the backing member; and
controlling means for causing the electrooptical converter to read the backing member so as to detect a variation of an electric signal along a direction in which the electrooptical converter lies, and for controlling, in response to an occurrence of a variation greater than a predetermined level, the driving mechanism so as to move a position of the electrooptical converter with respect to the backing member. According to this aspect of the present invention, it is possible to obtain image data not affected by a flaw or a stain in an original, by altering a position at which a reading is performed in case there is a flaw or a stain, the flaw or the stain being detected as a difference, exceeding a predetermined level, between data for one pixel and data for an adjacent pixel. Thus, variations in reading condition between pixels on a given line is canceled, thus preventing any streak from occurring in a read image. Consequently, a high-quality image can be obtained.

Still another object of the present invention is to provide an image reading method comprising the steps of:
reading the backing member by the electrooptical converter;
altering a relative position of the original and the electrooptical converter; and
reading the original.

According to the image reading method of the present invention, the colored area on the backing member corresponding to the ground color of the original is read first, whereupon the original is read. In this way, it is possible to carry out the whiteness level following operation smoothly, and a high-quality image can be obtained.

Yet another object of the present invention is to provide an image reading apparatus comprising:
an electrooptical converter for converting reflected light from an original that is illuminated into an electric signal;

converting means for converting an analog electric signal obtained in the electrooptical converter into digital data in accordance with a whiteness level signal indicating a maximum brightness, reading of the original being conducted while a relative position of the original and the electrooptical converter is being altered;

thickness detecting means for detecting a thickness of the original; and whiteness level correcting means for correcting the whiteness level to become a predetermined value in correspondence with the thickness, detected by the detecting means, of the original. According to this aspect of the present invention, the whiteness level is corrected to have an optimum level depending on the thickness of the original. Therefore, it is possible to obtain a high-quality image, irrespective of the thickness of the original.

Still another aspect of the present invention is to provide a whiteness level correcting method, wherein a whiteness level is corrected to become lower in level as the thickness of the original increases. Since a relatively thick original is less detached from a reading window than a relatively thin original, the thick original has a larger light reflectance. The above described aspect of the present invention ensures that the whiteness level in the thick original is corrected to become smaller in level than in the thin original. Accordingly, it is possible to read images in a stable manner, irrespective of the thickness of the original.

Still another object of the present invention is to provide an image reading apparatus having a first reading function wherein an original is illuminated and its image is read while the original is moved and an electrooptical converter for converting reflected light into an electric signal is fixed, and a second reading function wherein the original is illuminated and its image is read while the original is fixed and the electrooptical converter is moved, the image reading apparatus comprising whiteness level correcting means for correcting a whiteness level indicating a maximum brightness to have a predetermined value responsive to whether the first or second reading function is used. According to this aspect of the present invention, the whiteness level is corrected responsive to whether the first reading function or the second reading function is used. Accordingly, it is possible to read images in a stable manner, irrespective of the thickness of the original.

Still another object of the present invention is to provide a whiteness level correcting method, wherein a whiteness level is corrected to become greater in level when the first reading function is used in reading the original than when the second reading function is used. Since the first reading function, in which the original is moved, is characterized by a larger degree of detachment of the original from the reading window than the second reading function, in which the electrooptical converter is moved, the whiteness level in the first reading function is corrected to have a smaller level than that in the second reading function. In this way, a difference in brightness in images read in the first and second reading functions is reduced. Thus, it is possible to obtain read images in a stable manner, irrespective of the reading function used.

Still another object of the present invention is to provide an image reading apparatus comprising:

an electrooptical converter for converting reflected light from an original that is illuminated into an electric signal;

converting means for converting an analog electric signal obtained in the electrooptical converter into digital data in accordance with a whiteness level signal indicating a maximum brightness, reading of the original being conducted while a relative position of the original and the electrooptical converter is being altered; and whiteness level generating means for causing the electrooptical converter to read a blank sheet of a same kind as used for the original and for generating a whiteness level commensurate with data obtained by reading the blank sheet. According to this aspect of the present invention, the whiteness level is determined on the basis of the value obtained by reading a blank sheet of the same kind used for the original. Thus, it is possible to use a value corresponding to the ground color of the original to determine the whiteness level. In this way, an optimum whiteness level can be generated, and a high-quality image can be achieved.

Still another object of the present invention is to provide a whiteness level generating method, wherein an average value of the data obtained by causing the electrooptical converter to read the blank sheet is set to be a whiteness level. According to this aspect of the present invention, an average value of image data obtained by reading a blank sheet is calculated, and the average value is used as the whiteness level. Thus, an optimum whiteness level can be generated, and a high-quality image can be obtained.

Still another object of the present invention is to provide an image reading apparatus having a first reading function wherein an original is illuminated and its image is read while the original is moved and an electrooptical converter for converting reflected light into an electric signal is fixed, and a second reading function wherein the original is illuminated and its image is read while the original is fixed and the electrooptical converter is moved, the image reading apparatus comprising converting means for converting an analog electric signal output from the electrooptical converter into digital data commensurate with a blackness level indicating a minimum brightness; and blackness level correcting means for correcting a blackness level to have a predetermined value corresponding to whether the first or second reading function is used.

Since the first reading function is characterized by a larger degree of detachment of the original from the reading window than the second reading function is moved, the blackness level in the first reading function is corrected to have a level different from that in the second reading function. In this way, it is possible to make sure that the blackness level is regular irrespective of the reading function.

BRIEF DESCRIPTION OF THE INVENTION

Other objects and further features of the present invention will be apparent from the following detailed description when read in conjunction with the accompanying drawings, in which:

FIG. 8 is a graph which explains an operation of the first embodiment;

FIGS. 9A and 9B show a construction of a variation of the backing part according to the first embodiment;

Figure 17:
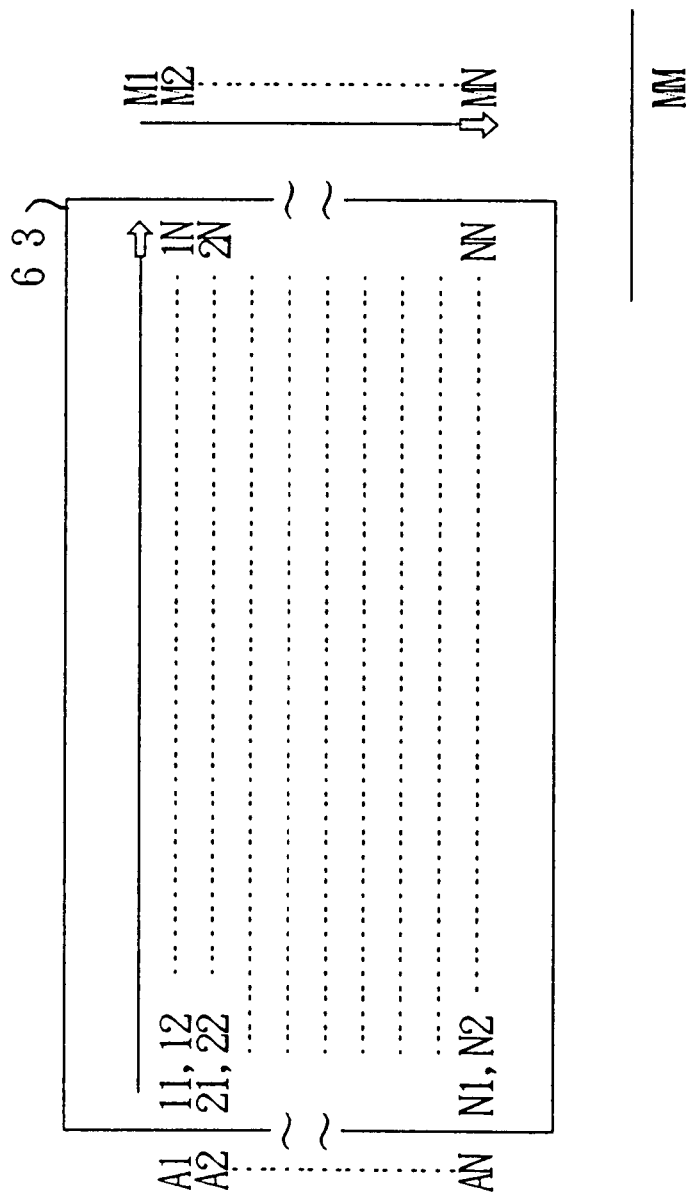
Figure 18:
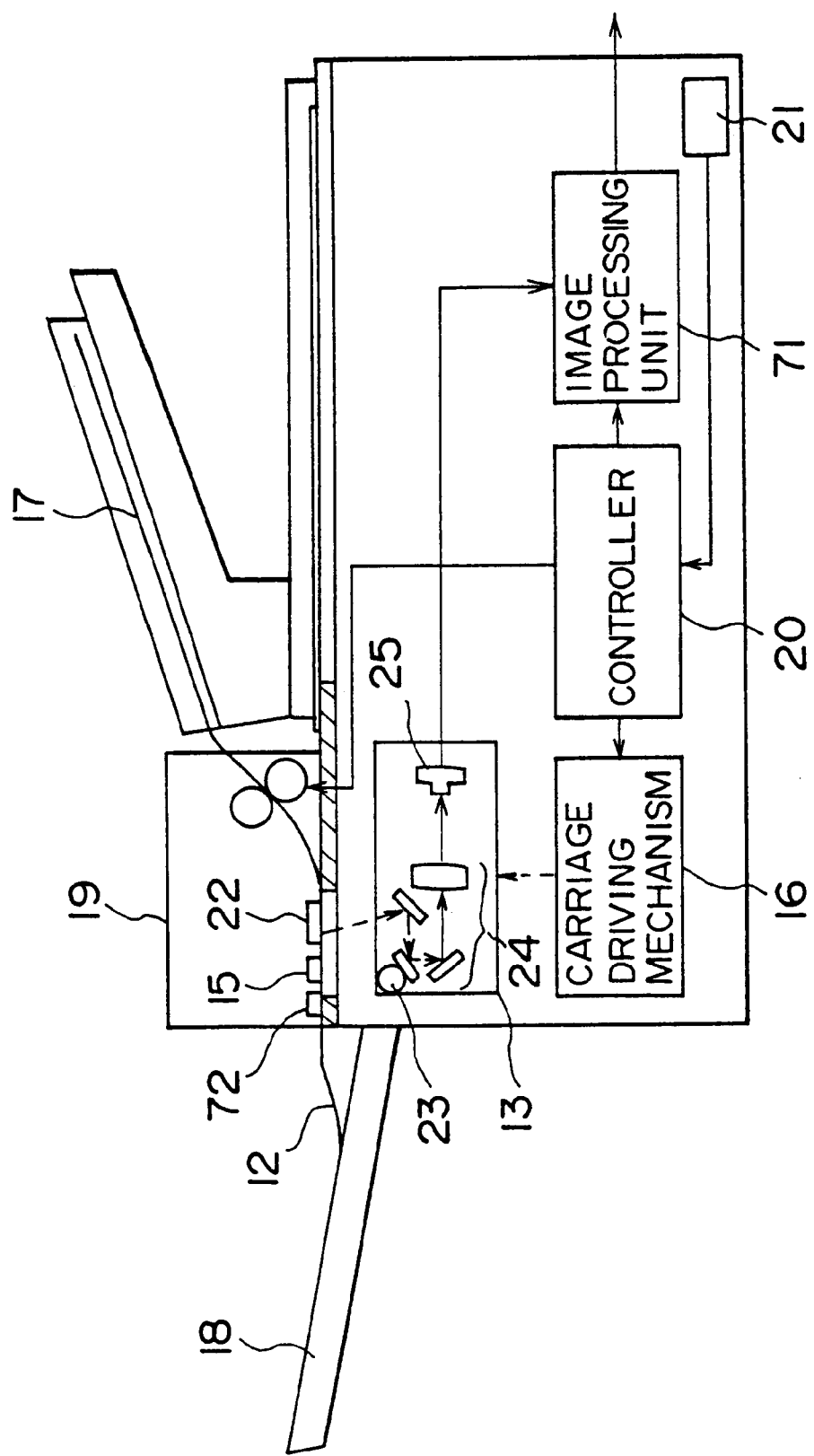
Figure 19:
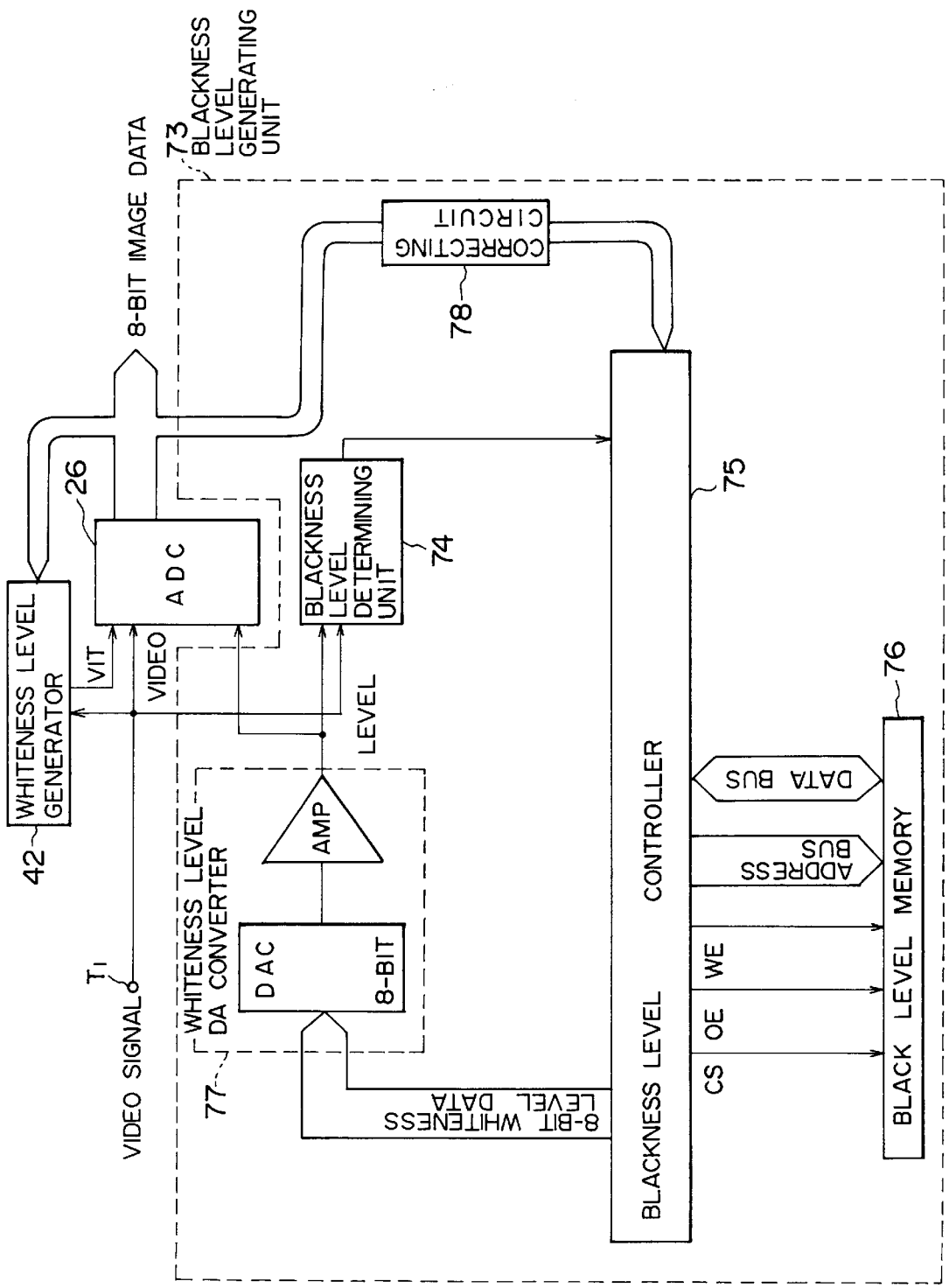
Figure 20:
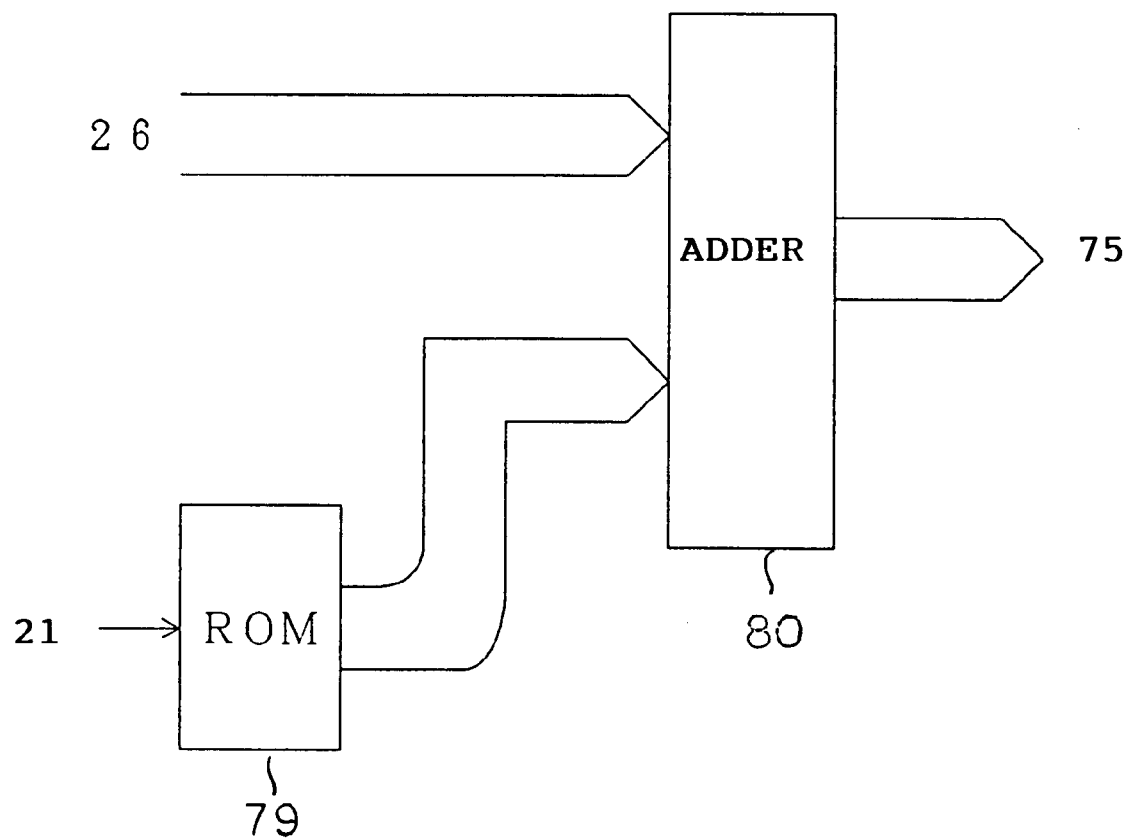

FIG. 17 explains an operation of the second variation of the correcting circuit according to the second embodiment;

FIG. 18 shows a schematic construction of a third embodiment of the present invention;

FIG. 19 is a block diagram showing a construction of an image processing unit according to the third embodiment; and FIG. 20 shows a construction of a correcting circuit according to the third embodiment.

DESCRIPTION OF THE PREFERRED EMBODIMENTS

Figure 1:
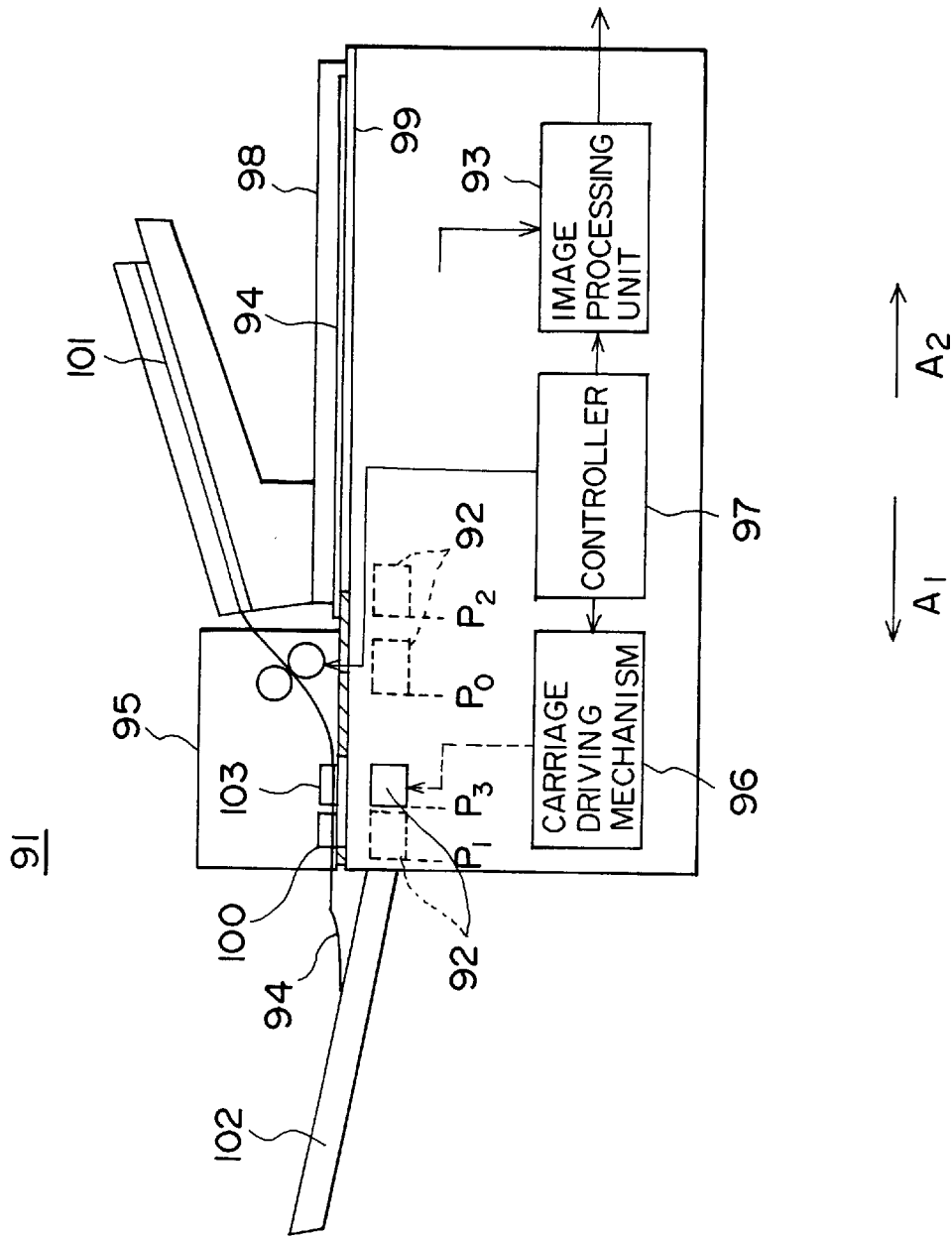
FIG. 1 shows a schematic construction of a conventional image reading apparatus.
Figure 2:
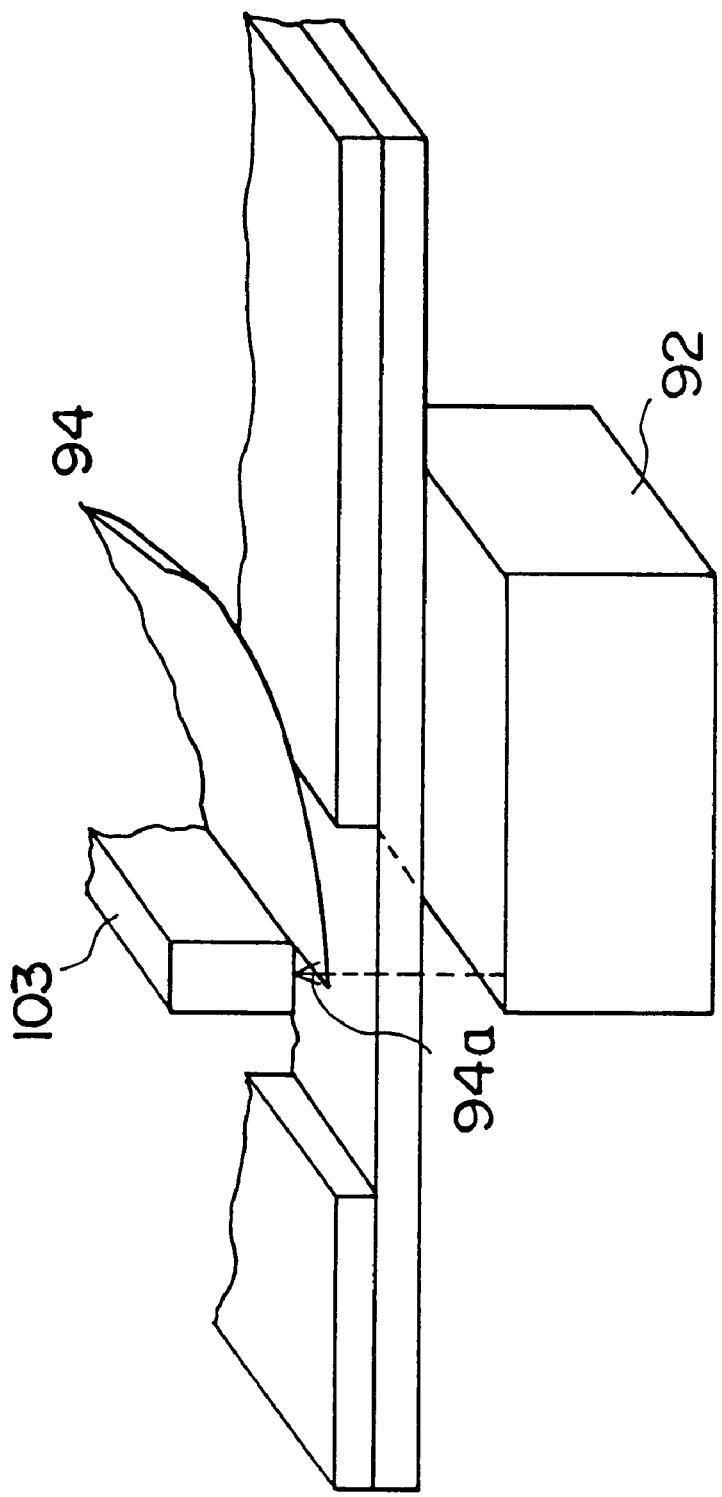
FIG. 2 shows a construction of an essential part of a conventional image reading apparatus.
Figure 3:
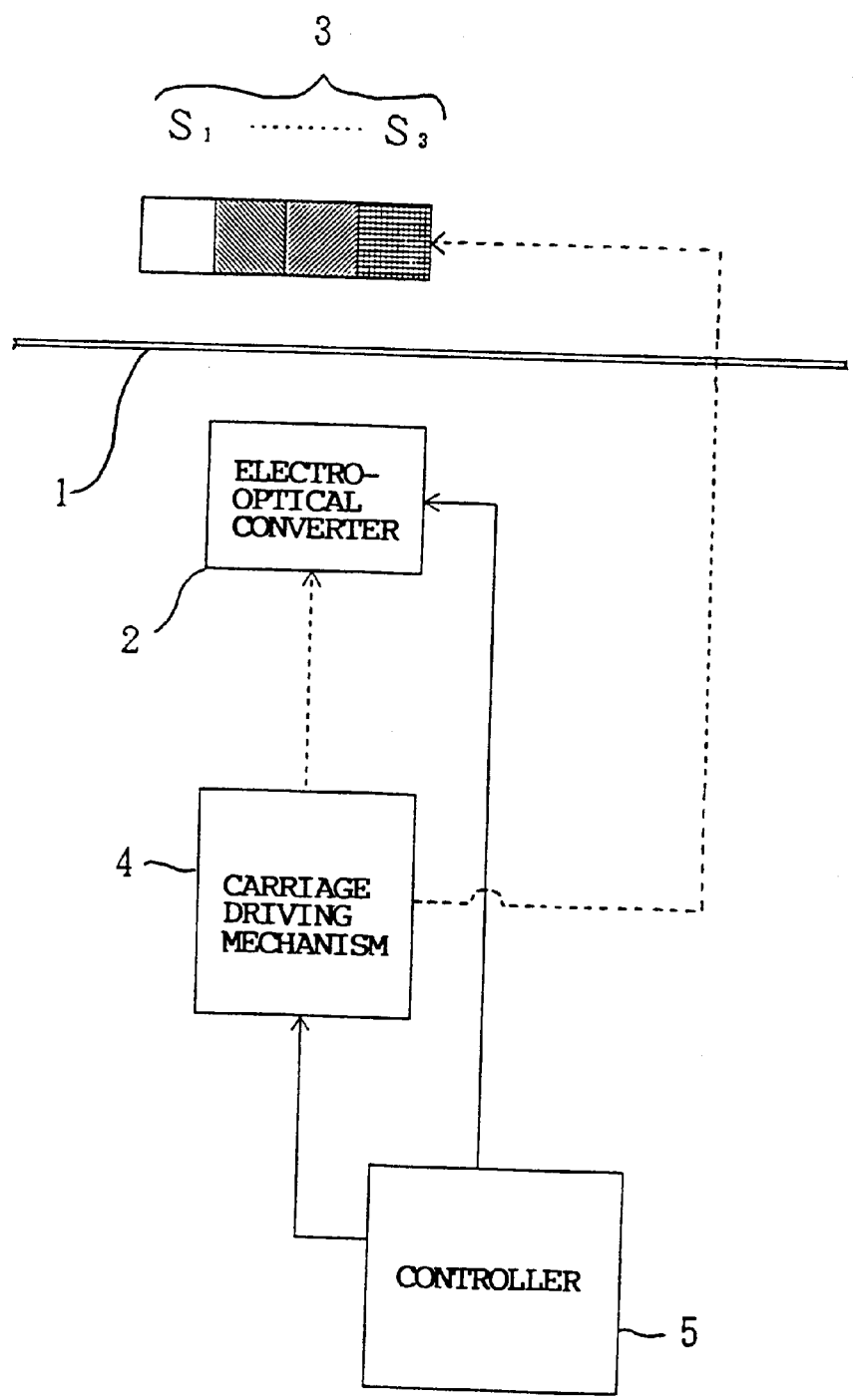
FIG. 3 is a schematic diagram showing the principle of the present invention.

FIG. 3 shows the principle of the first embodiment of the present invention.

An electrooptical converter 2 converts light reflected by an illuminated original 1 into an electric signal.

A backing member 3 has colored areas $S_1$–$S_n$ arranged side by side in a direction in which the electrooptical converter 2 is moved by a carriage driving mechanism 4. The colored areas $S_1$–$S_n$ have different colors. The backing member 3 is provided opposite the electrooptical converter 2 when the ADF function is activated in reading the original 1 so as to support the back side of the original 1.

The carriage driving mechanism 4 causes relative positions of the original 1 and the electrooptical converter 2 to vary.

When the ADF function is activated in reading the original 1, a controller 5 controls the carriage driving mechanism 4 in a manner adapted for the original 1. The controller 5 controls a position at which the electrooptical converter 2 faces the backing member 3 so as to control which color of the backing member 3 is opposite the electrooptical converter 2.

Figure 4:
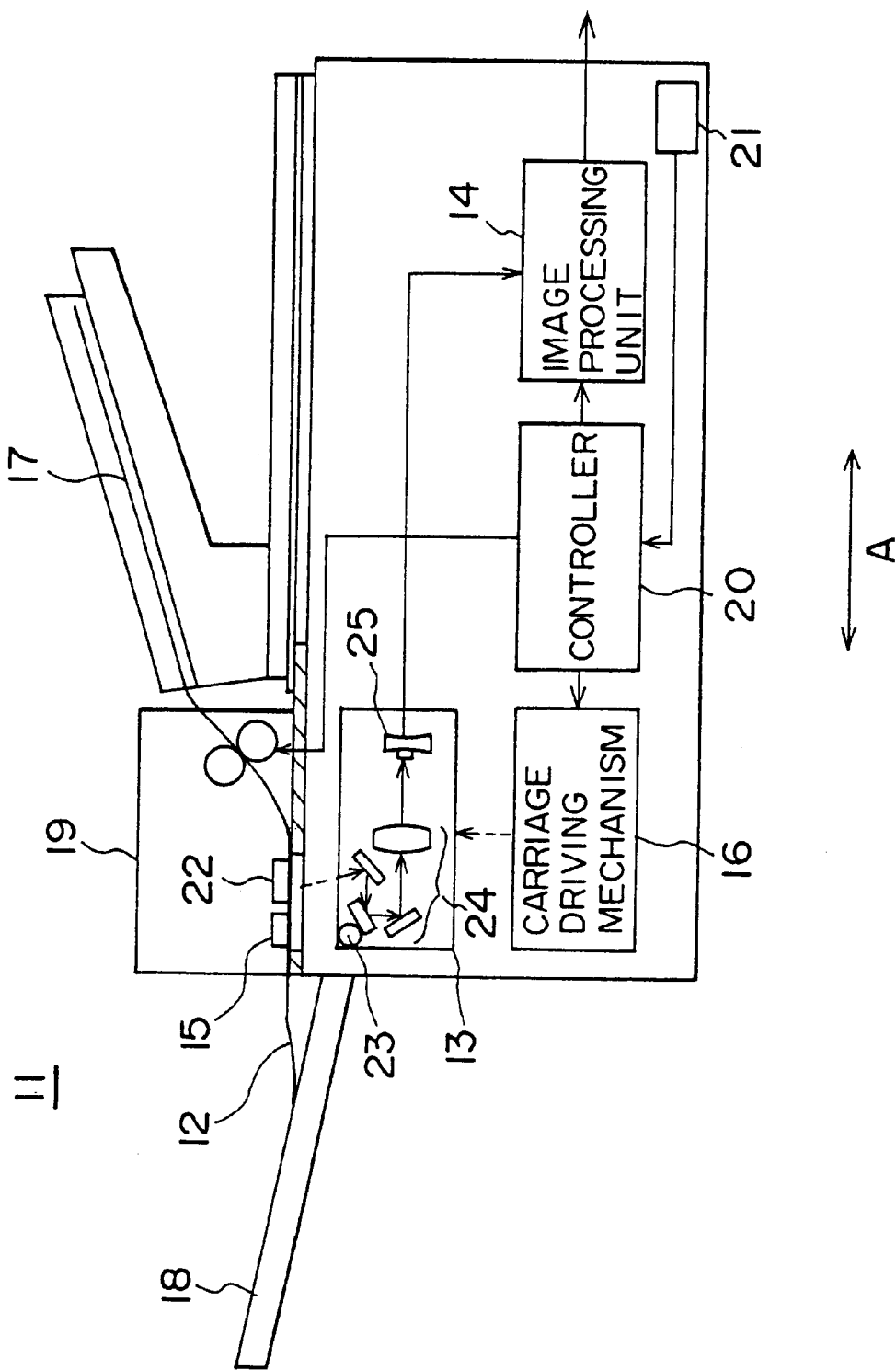
FIG. 4 shows a schematic construction of an image reading apparatus according to a first embodiment of the present invention.

FIG. 4 is a schematic diagram showing a construction of a first embodiment of the present invention. An image reading apparatus 11 of the first embodiment includes: an image detecting unit 13 for optically detecting an image on an original 12 and converting the optical signal into an electric signal; an image processing unit 14 for processing the electric signal from the image detecting unit 13; a white reference plate 15 which is read by the image detecting unit 13 and provides a reference whiteness level necessary for signal processing in the image processing unit 14; a carriage driving mechanism 16 for moving the image detecting unit 13 in a direction indicated by an arrow A in the FB mode; a feeding mechanism 19 for feeding the original 12 from a feeder 17 to a stacker 18 in the ADF mode; a controller 20 for controlling the operation of the whole apparatus; an operation part 21 for providing operation instructions; and a backing part 22 which is provided opposite the image detecting unit 13 when the original 12 is read in the ADF mode so as to support the back side of the original 12, and ensures that the leading edge of the original 12 is read in the ADF mode.

The image detecting unit 13 includes: a light source 23 for illuminating the original 12 surface provided with an image; an optical system 24 which has light reflected from the original 12 introduced in a predetermined direction; and an electrooptical converter 25 which has light introduced from the optical system 24 and converts the light thus introduced into an electric signal. The image detecting unit 13 is designed to be moved by the carriage driving mechanism 16 in the A direction.

Figure 5A:
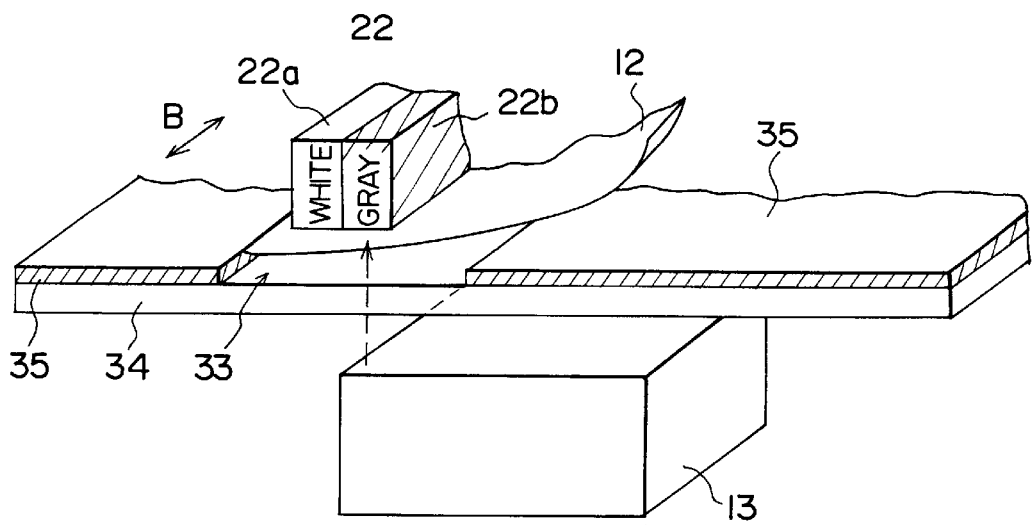
FIGS. 5A and 5B show a construction of a backing part according to the first embodiment.
Figure 5B:
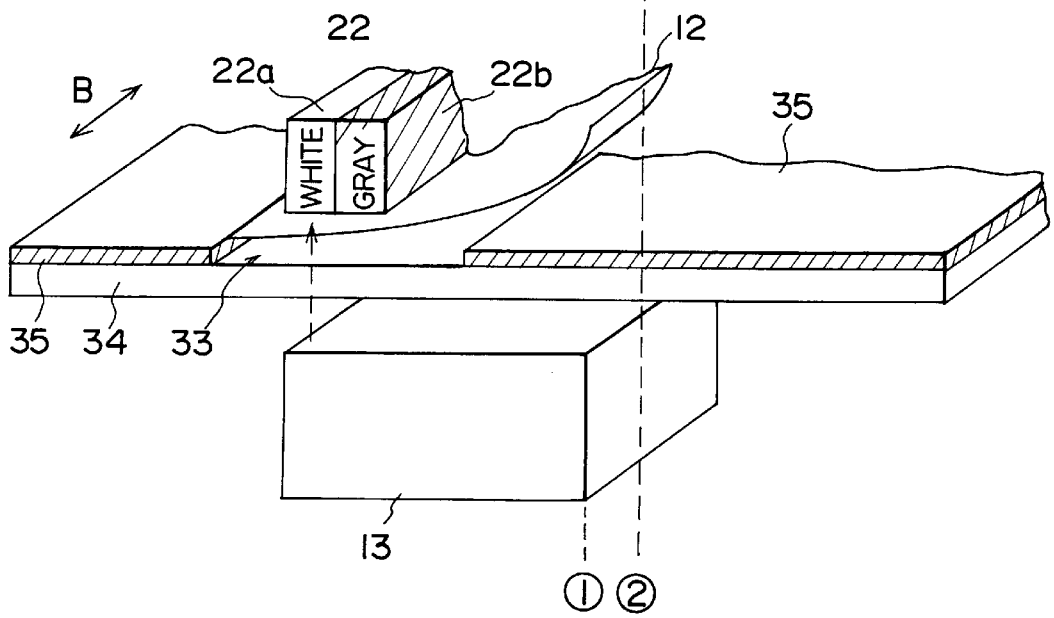

The light source 23 is formed, for example, of a fluorescent lamp and emits light whose intensity is uniform in a longitudinal direction (in a direction indicated by an arrow B of FIGS. 5A and 5B). The light emitted by the light source 23 is incident on the original 12 via a reading window 33. The reading window 33 is formed as an opening of a shade 35 provided as wires built in layers within a glass plate 34. The original 12 reflects light incident thereon in correspondence with the image thereon. The light reflected by the original 12 is fed to the optical system 24.

The optical system 24 comprises mirrors and lenses lying in the longitudinal (line direction) direction and compresses the light reflected by the original 12 in the line direction and feeds the result to the electrooptical converter 25. The electrooptical converter 25 is embodied, for example, by a line-type two-dimensional CCD which generates and outputs, line by line, a video signal corresponding to the image on the original. The electric signal obtained in the electrooptical converter 25 is fed to the image processing unit 14.

FIGS. 5A and 5B show a construction of the backing part 22. The backing part 22 comprises a white area 22a and a gray area 22b lying parallel in the longitudinal direction (the B direction). FIG. 5a shows a position of the image detecting unit 13 at which position the gray area 22b is selected, and FIG. 5B shows a position of the image detecting unit 13 at which position the white area 22a is selected.

Figure 6:
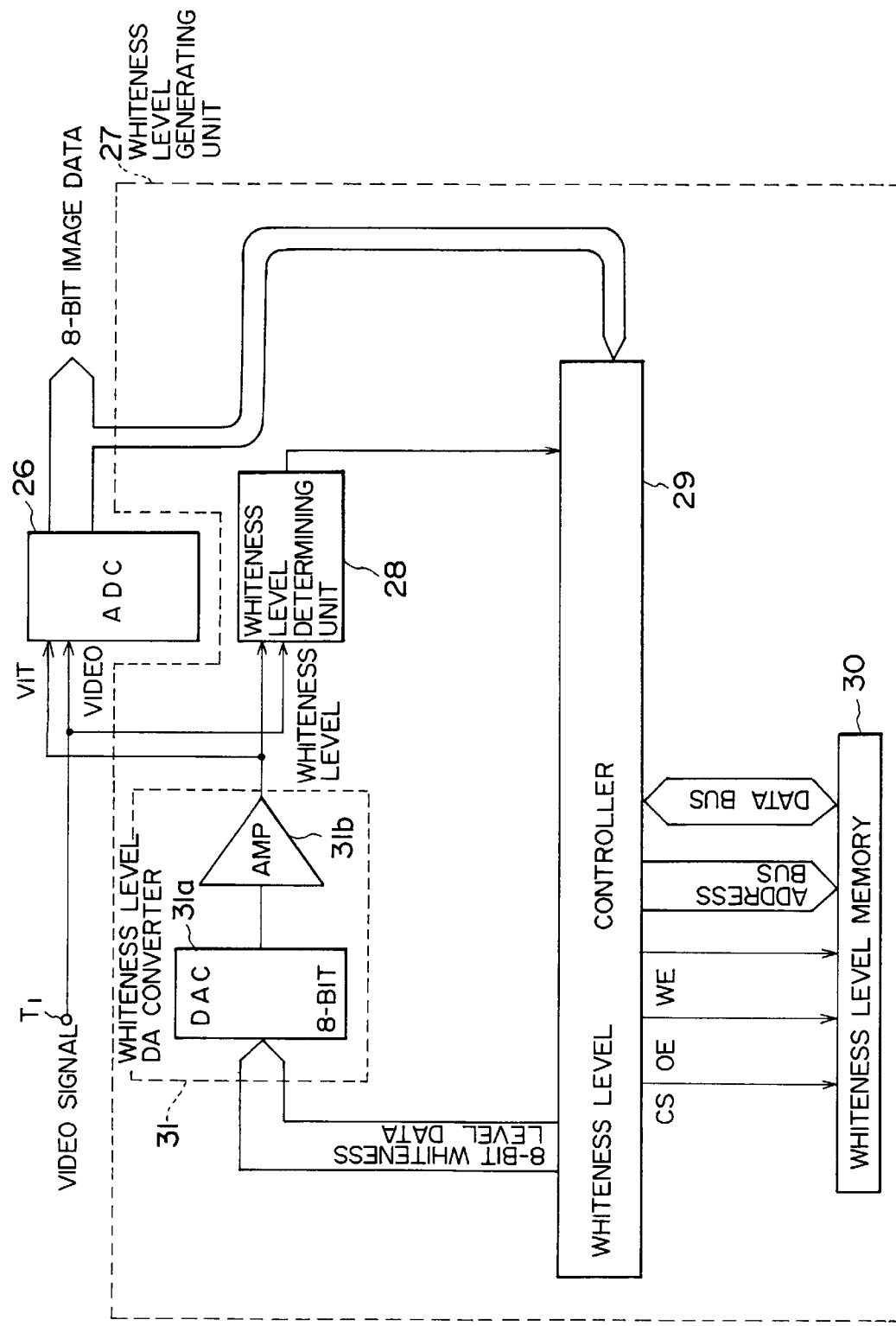
FIG. 6 is a block diagram showing a construction of an image processing unit according to the first embodiment.

FIG. 6 shows a construction of the image processing unit 14. The image processing unit 14 comprises an A/D converter 26 for converting an electric signal from the image detecting unit 13 into digital data; and a whiteness level generating unit 27 for generating a whiteness level signal which controls the level of the signal converted by the A/D converter 26.

The analog signal obtained in the image detecting unit 13 is fed to a terminal $T_1$. The terminal $T_1$ is connected to the A/D converter 26 and the whiteness level generating unit 27.

The A/D converter 26 converts the analog electric signal from the image detecting unit 13 into 8-bit digital data. The analog signal is converted into the 8-bit digital data on the basis of the whiteness level signal output from the whiteness level generating unit 27. The whiteness level generating unit 27 includes: a whiteness level determining unit 28 which compares the video signal supplied from the terminal $T_1$ and the whiteness level signal generated in the whiteness level generating unit 27 and determines the whiteness level; a whiteness level controller 29 which generates reference whiteness level data in accordance with the digital data output from the whiteness level determining unit 28 and the A/D converter 26, and causes the whiteness level to vary in accordance with the comparison result yielded by the whiteness level determining unit 28 so as to effect the white-level following operation; a whiteness level memory 30 for storing the whiteness level data generated by the whiteness level controller 29; and a whiteness level D/A converter 31 which converts the whiteness level data generated by the whiteness level controller 29 into an analog signal and generates the output whiteness level signal to be fed to the A/D converter 26 and the whiteness level determining unit 28.

The whiteness level determining unit 28 is embodied, for example, by a comparator and compares the video signal supplied to the terminal $T_1$ and the output whiteness level signal. The whiteness level determining unit 28 supplies a high-level whiteness level follow signal to the whiteness level controller 29 when the video signal is greater in level than the output whiteness level signal, and supplies a low-level whiteness level follow signal when the video signal is smaller in level than the output whiteness level signal.

The whiteness level controller 29 is embodied by a CPU etc. The whiteness level controller 29 fixes the whiteness level when the image such as a photograph is read. When a line drawing or the like is read, the whiteness level controller 29 generates the follow whiteness level data in accordance with the whiteness level follow signal from the whiteness level determining unit 28. The generated data is stored in the whiteness level memory 30. The stored data is used as the whiteness level data for the next line. The whiteness level controller 29 intensifies the level of the whiteness level data by a predetermined number of steps when the whiteness level follow signal is at a high level. When the whiteness level follow signal is at a low level, the whiteness level controller 29 compares the image data obtained and the whiteness level data. In case a difference therebetween exceeds a predetermined value, the whiteness level data is lowered in level by a predetermined number of steps so that the whiteness level data is made to follow so as to suppress the video below the whiteness level.

The whiteness level memory 30 is embodied by a RAM or the like and stores the whiteness level data for each pixel in a line.

Figure 7:
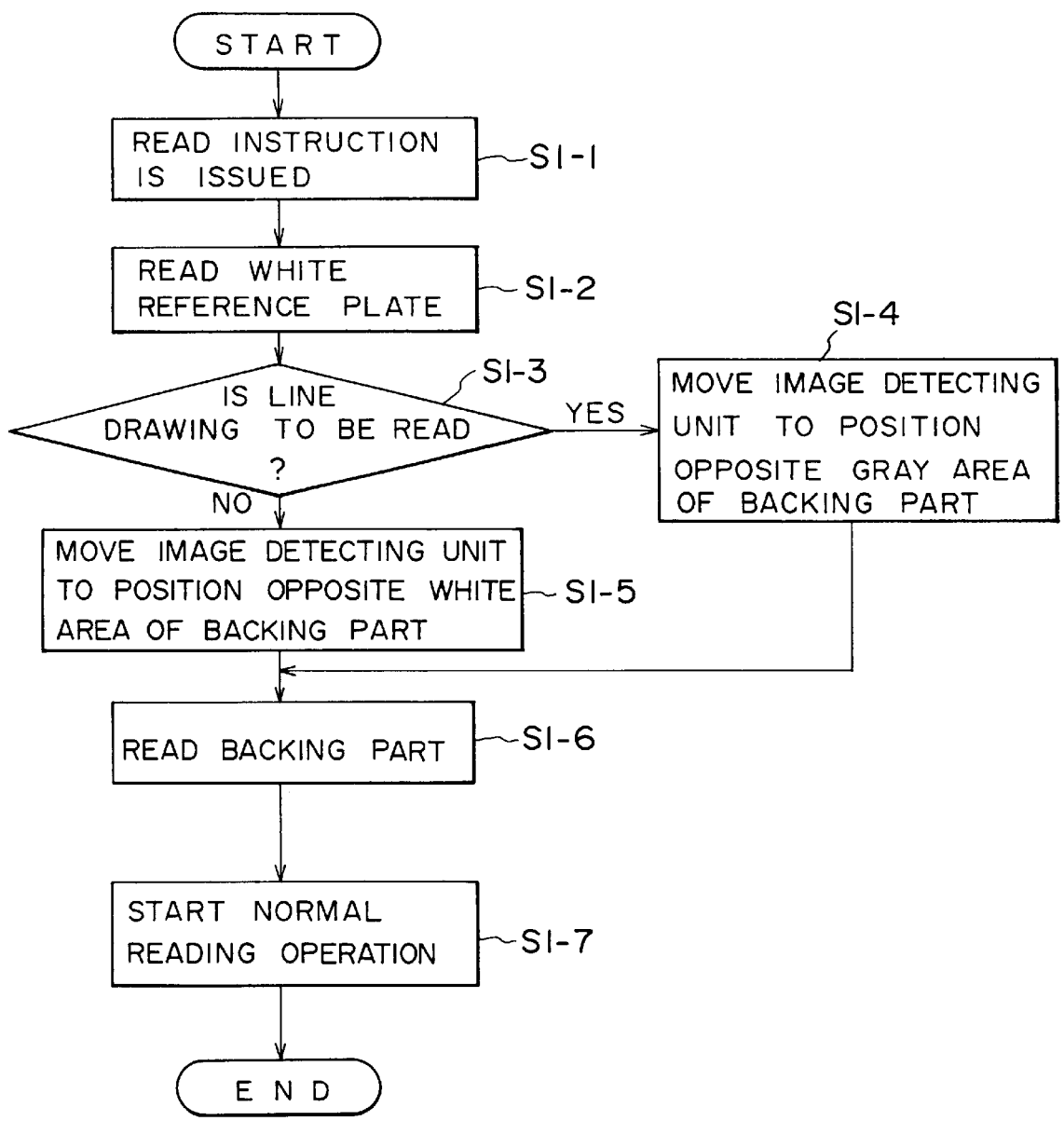
FIG. 7 is a flowchart which explains an operation of the first embodiment.

FIG. 7 explains an operation of the present invention. When an instruction to read image is issued, the controller 20 controls the carriage driving mechanism 16 so that the image detecting unit 13 is moved to a position opposite the white reference plate 15 to read the white reference plate 15 (S1-1). The data read from the white reference plate 15 is supplied to the whiteness level controller 29 via the A/D converter 26. The whiteness level controller 29 uses this data as the reference whiteness data and stores the same in the whiteness level memory 30 (S1-2).

The controller 20 then determines whether or not a line drawing is to be read (S1-3). Selection of a line drawing is made through the operation of the operation part 21 by a user.

If it is determined in S1-3 that a line drawing is to be read, the controller 20 controls the carriage driving mechanism 16 so as to move the image detecting unit 13 to a position indicated by 2 in FIGS. 5A and 5B which position is opposite the gray area 22b of the backing part 22 (S1-4). When it is determined in S1-3 that an image other than a line drawing is to be read, which means that a photograph or the like that includes halftones is to be read, the controller 20 controls the carriage driving mechanism 16 so as to move the image detecting unit 13 to a position indicated by 1 in FIGS. 5A and 5B which position is opposite the white area 22a of the backing part 22 (S1-5).

The controller 20 then controls the image detecting unit 13 so that a normal reading operation is started at the white area 22a or the gray area 22b of the backing part 22 (S1-6, S1-7). The reference whiteness level data obtained by reading the white reference plate 15 is compared with the image data obtained by reading the white area 22a or the gray area 22b of the backing part 22, by the whiteness level determining unit 28. The gray area 22b is designed such that a difference between the image data obtained by reading the gray area 22b and the reference whiteness level data obtained by reading the white reference plate 15 exceeds a predetermined level.

The whiteness level determining unit 28 determines the data read from the white area 22a or the gray area 22b of the backing part 22 to be the whiteness level. The image data obtained by reading the white area 22a or the gray area 22b of the backing part 22 and determined to be the whiteness level is stored as the whiteness level data and used as the whiteness level data for the next line.

When the gray area 22b of the backing part 22 is read in the line art mode, the whiteness level generating unit 27 employs the color of gray obtained by reading the gray area 22b of the backing part 22 as the reference whiteness level. This whiteness level is made to follow the image data read thereafter.

Since the ground color of the original 12 is not exceeded in level by any color data, the white-level following operation is conducted such that, if the read image data is greater, that is, brighter than the reference whiteness level, it can be determined that the current image data indicates a color similar to the ground color of the original 12. In this case, irrespective of the difference between the image data and the reference whiteness data, the read image data is determined to be the whiteness level data.

In case the read image data is slightly lower in level than the reference whiteness level, it is determined that the associated area of the original is temporarily darkened due to warp etc. of the original 12. If, in this case, the whiteness data is made to follow the image data, the whiteness level becomes unstable. For the whiteness level to become more stable, the whiteness level is made to follow the image data when the difference between the image data and the reference whiteness level exceeds a predetermined level.

FIG. 8 explains an operation of the first embodiment of the present invention. In the figure, time t is assigned for the x-axis, and the image data is assigned for the y-axis. A time interval $t_0$–$t_1$ indicates a period of time during which the image detecting unit 13 is reading the backing part 22, and a time interval beyond $t_1$ indicates a period of time during which the image detecting unit 13 is reading the original 12.

$L_1$ indicates image data obtained by reading the gray area 22b of the backing part 22; $L_2$ reference whiteness level data obtained by reading the white reference plate 15; and $L_3$ image data obtained by reading the ground color of the original 12.

When the backing part 22 is read at the time $t_0$, the reference whiteness level is made to follow the image data $L_1$ obtained by reading the gray area 22b of the backing part 22 because there is a difference greater than a predetermined value $L_0$ between the reference whiteness level data $L_2$ obtained by reading the white reference plate 15 and the image data obtained by reading the gray area 22b of the backing part 22.

When the reading of the original 12 is started at the time $t_1$, the reference whiteness level data $L_1$ is made to follow the image data $L_3$ indicating the ground color of the original 12, irrespective of the aforementioned difference, because the reference whiteness level data $L_1$ obtained by reading the gray area 22b of the backing part 22 is lower in level than the image data $L_3$ indicating the ground color of the original 12.

In this way, the reference whiteness level is made to follow the level of the ground color of the original 12.

As has been described, by reading the gray area 22b of the backing part 22, the reference whiteness level can be smaller than the level of the data indicating the ground color of the original 12. It is then possible to make the reference whiteness level follow the ground color of the original 12, irrespective of the difference between the ground color of the original 12 and the reference whiteness level. Thus, it is possible to read an image using the ground color of the original 12 as the reference whiteness level. As a result, proper contrast can be obtained in a line drawing etc. in which an image is represented against the background of the ground color of the original 12.

The first embodiment will be summarized in the following. When an image reading is started at the backing part 22 in order to ensure that the leading edge of the original 12 is read, the reference whiteness level can be made to follow the ground color of the original 12 as described above, by designing the backing part 22 to have a gray area whose brightness level is lower than the ground color of the original 12. Accordingly, the ground color of the original 12 can be used as the reference whiteness level, thus ensuring proper contrast is achieved in reading the image, and the quality of the read image is improved.

FIGS. 9A and 9B show a construction of a variation of first embodiment. A backing part 32 of this variation is constituted such that each of white areas 32a and gray areas 32b is formed to be relatively wide so that a plurality of reference whiteness level reading operations corresponding to a plurality of lines (white areas ①–③, gray areas ④–⑥) is possible.

Accordingly, the operation of the controller 20 and the whiteness level controller 29 is modified a little.

The whiteness level controller 29 is embodied by a CPU etc. The ground color of a photograph is usually white; that is, a photographic image is constituted with white as the reference color. Hence, an image true to a photograph can be obtained by fixing the whiteness level at the reference whiteness level. In the case of a line drawing etc., the image is represented by a contrast against the ground color. This contrast is properly reproduced by using the ground color of the line drawing etc., as the whiteness level. The whiteness level controller 29 generates the follow whiteness level data in accordance with the whiteness level follow signal from the whiteness level determining unit 28, when a line drawing or the like is read. The generated data is stored in the whiteness level memory 30. The stored data is used as the whiteness level data for the next line. The whiteness level controller 29 intensifies the level of the whiteness level data by a predetermined number of steps when the whiteness level follow signal is at a high level. The whiteness level data is made to follow so as to suppress the video signal below the whiteness level.

The whiteness level memory 30 is embodied by a RAM or the like and stores the whiteness level data for each pixel in a line.

Figure 10:
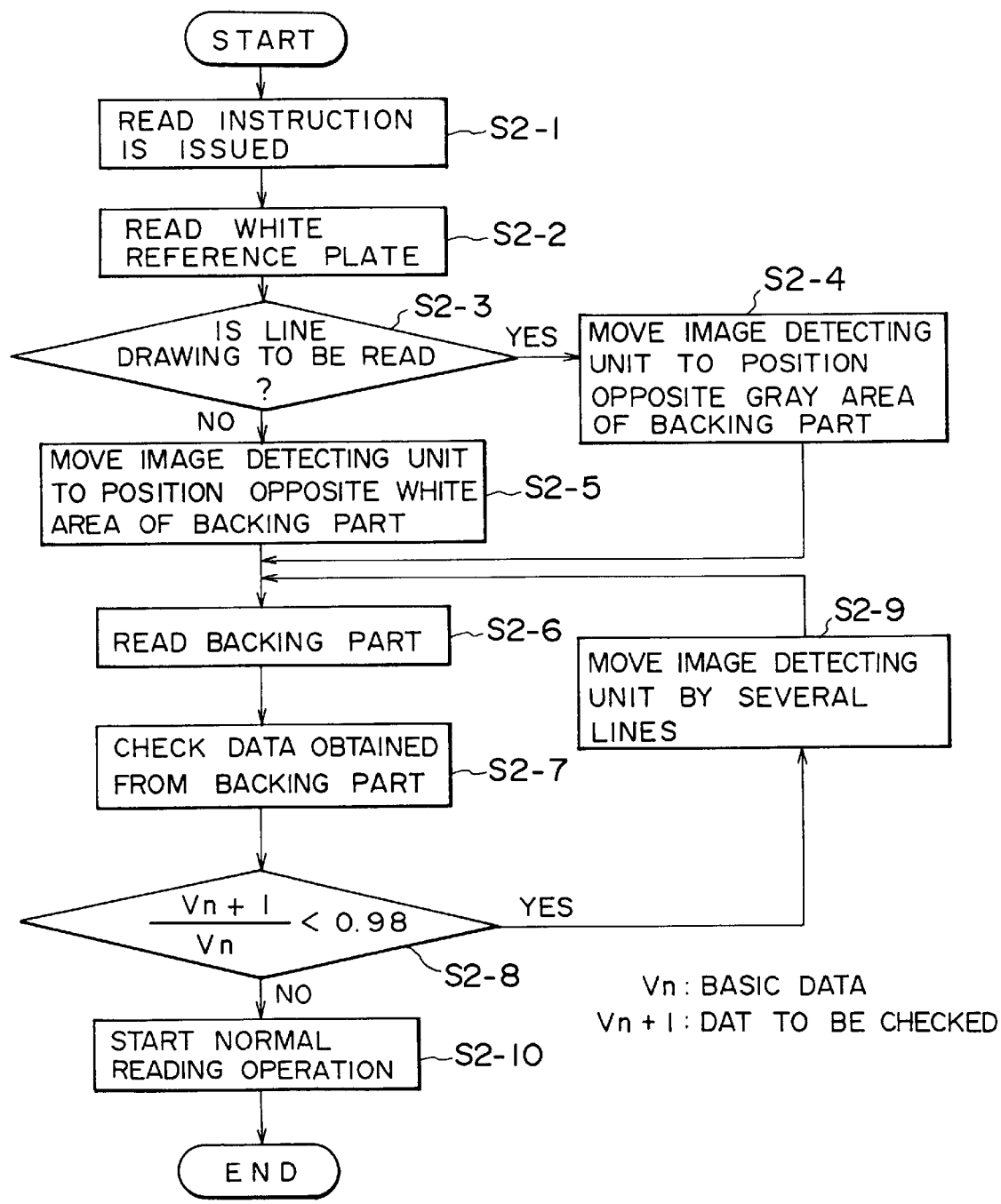
FIG. 10 is a flowchart which explains an operation of the variation of the first embodiment.

FIG. 10 explains an operation of the variation. When an instruction to read an image is issued, the controller 20 controls the carriage driving mechanism 16 so that the image detecting unit 13 is moved to a position opposite the white reference plate 15 to read the white reference plate 15 (S2-1). The data read from the white reference plate 15 is supplied to the whiteness level controller 29 via the A/D converter 26. The whiteness level controller 29 uses this data as the reference whiteness data and stores the same in the whiteness level memory 30 (S2-2).

The controller 20 then determines whether or not a line drawing is to be read (S2-3). Selection of a line drawing is made through the operation of the operation part 21 by a user.

If it is determined in S2-3 that a line drawing is to be read, the controller 20 controls the carriage driving mechanism 16 so as to move the image detecting unit 13 to a position indicated by 4 in FIGS. 9A and 9B which position is opposite the gray area 32B of the backing part 32 (S2-4). When it is determined in S2-3 that an image other than a line drawing is read, the controller 20 controls the carriage driving mechanism 16 so as to move the image detecting unit 13 to a positon ① in FIGS. 9A and 9B which position is opposite the white area 32a if the backing part 32 (S2-5).

The controller 20 then controls the image detecting unit 13 to read the white area 32a or the gray area 32b of the backing part 32 (S2-6). The read data is supplied to the whiteness level controller 29 and stored in the whiteness level memory 30 as the reference whiteness level data.

The whiteness level controller 29 is then controlled so as to check the read reference whiteness level data (S2-7). Assuming that the image data for two adjacent pixels is $V_n$ and $V_{n+1}$, respectively, (or assuming that the image data for each pixel is $V_{n+1}$ when the basic data is set to be $V_n$), or assuming that the data for a predetermined pixel is $V_n$ and the data for another pixel is $V_{n+1}$, the whiteness level controller 29 determines whether a ratio $(V_{n+1})/V_n$ between the $V_n$ and $V_{n+1}$ exceeds 0.98 (S2-8). If it is determined in S2-8 that $(V_{n+1})/V_n<0.98$, it means that there is a stain or a flaw. The carriage 16 is then controlled so as to move the image detecting unit 13 by several lines so that the image detecting unit 13 can read the position ② or the position ⑤ indicated in FIGS. 9A and 9B, instead of the position ① or the position ④ (S2-9). The reading is then started over.

When it is determined in S2-8 that $(V_{n+1})/V_n \geq 0.98$, it means that position of the backing part 32 which is read is in a normal condition. A normal reading operation of the original 21 is then conducted (S2-10). In the above description, a determination about a stain or a flaw is made on the basis of the image data for two adjacent pixels, the determination may also be made on the basis of the image data for pixels not adjacent to each other.

In the above described variation of the first embodiment, the position of the image detecting unit is shifted when there is a flaw or a stain in the backing part 32 so that the unit is moved to a position opposite the backing part portion that is free from a flaw or stain. Hence, the reading operation is not affected by a flaw or a stain. While a determination of a presence of a flaw or a stain is given when the condition $V_{n+1}/V_n \geq 0.98$ holds, other numerical values may be used as long as the read image is not unfavorably affected. For example, the determination may be given when the condition $V_{n+1}/V_n \geq 1.02$ holds. It is to be noted that the condition $V_{n+1}/V_n \geq 0.98$ and the condition $V_{n+1}/V_n \geq 1.02$ may be used jointly to give the determination because the image data for a pixel may be seriously affected by a flaw etc. and exhibits a largely different value from the data for the neighboring pixel.

Figure 11:
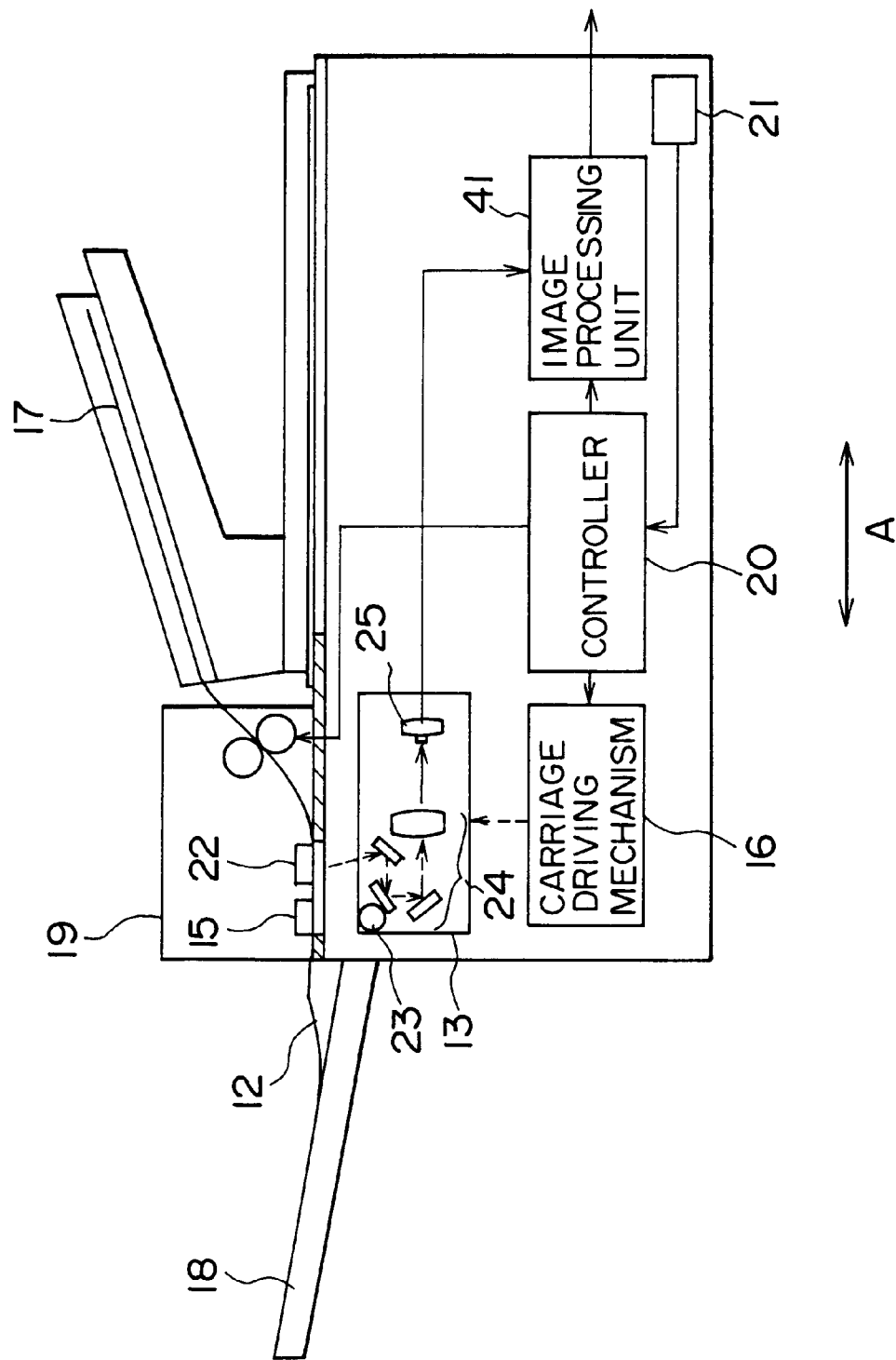
FIG. 11 shows a schematic construction of an image reading apparatus according to a second embodiment of the present invention.
Figure 12:
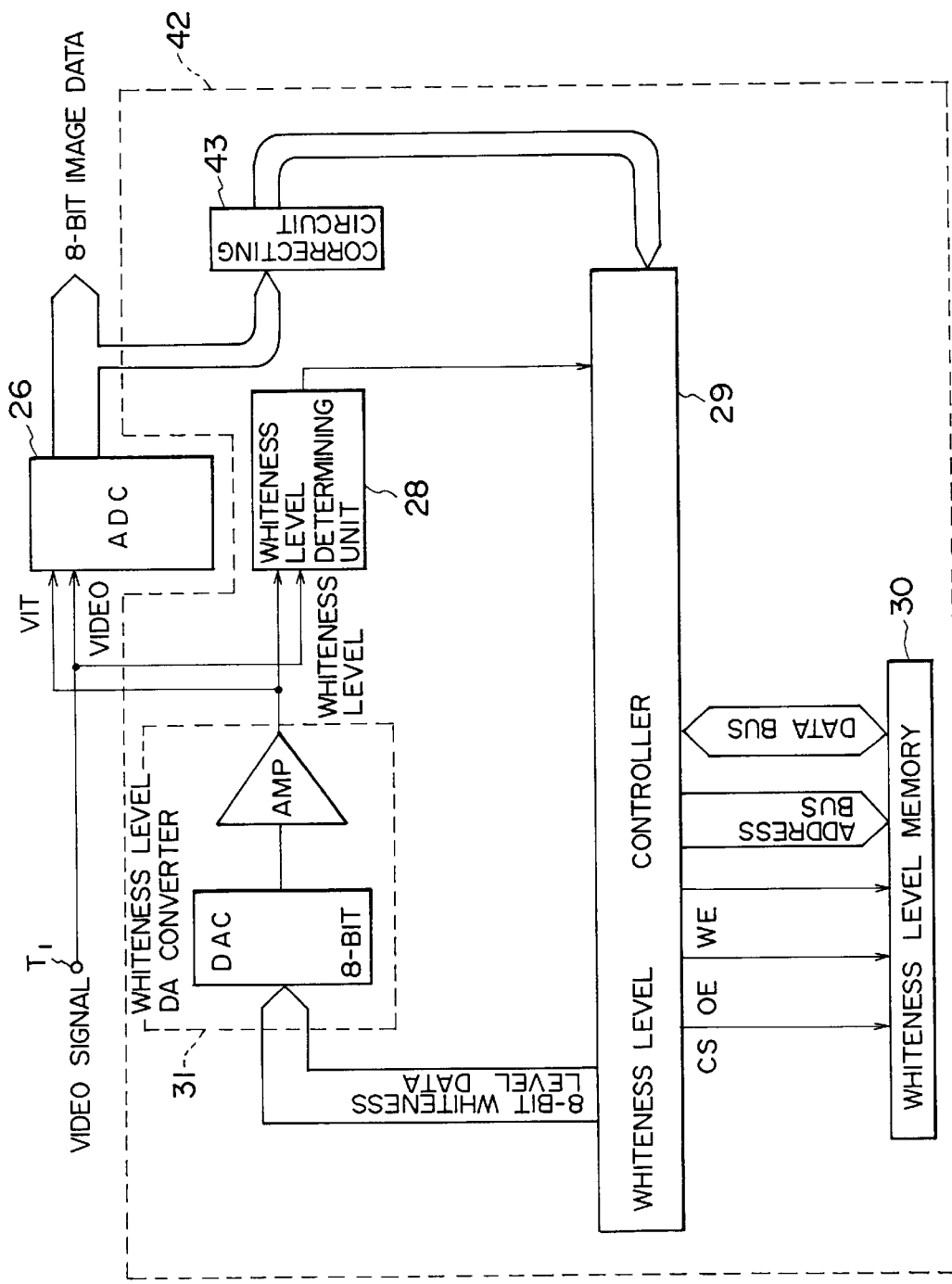
FIG. 12 is a block diagram showing a construction of the image reading apparatus according to the second embodiment.

FIG. 11 shows a schematic construction of a second embodiment of the present invention. FIG. 12 is a block diagram of an essential part of the second embodiment. In the figures, those components that are the same as the components of FIGS. 4 and 6 are designated by the same reference numerals, and the description thereof is omitted.

In a conventional image reading apparatus, the image quality, such as contrast, obtained in the ADF mode and that obtained in the FB mode may differ. This difference is due to difference in light reflectance between an original processed in the ADF mode and an original processed in the FB mode. In the ADF mode, the original is transported so that it is impossible for the original to be firmly in contact 35 with a reading window, whereas, in the FB mode, the original is fixed by being firmly in contact with the reading window. In the second embodiment, this difference is overcome by referring to different whiteness levels in the FB mode and in the ADF mode so that the image can be read with the same quality. The second embodiment differs from the first embodiment in that an image processing unit 41 is used instead of the image processing unit 14. The image processing unit 41 of the second embodiment includes the A/D converter 26 and a whiteness level generating unit 42. The whiteness level generating unit has a correcting circuit 43 for correcting digital data supplied from the A/D converter 26 to the whiteness level controller 29.

Figure 13:
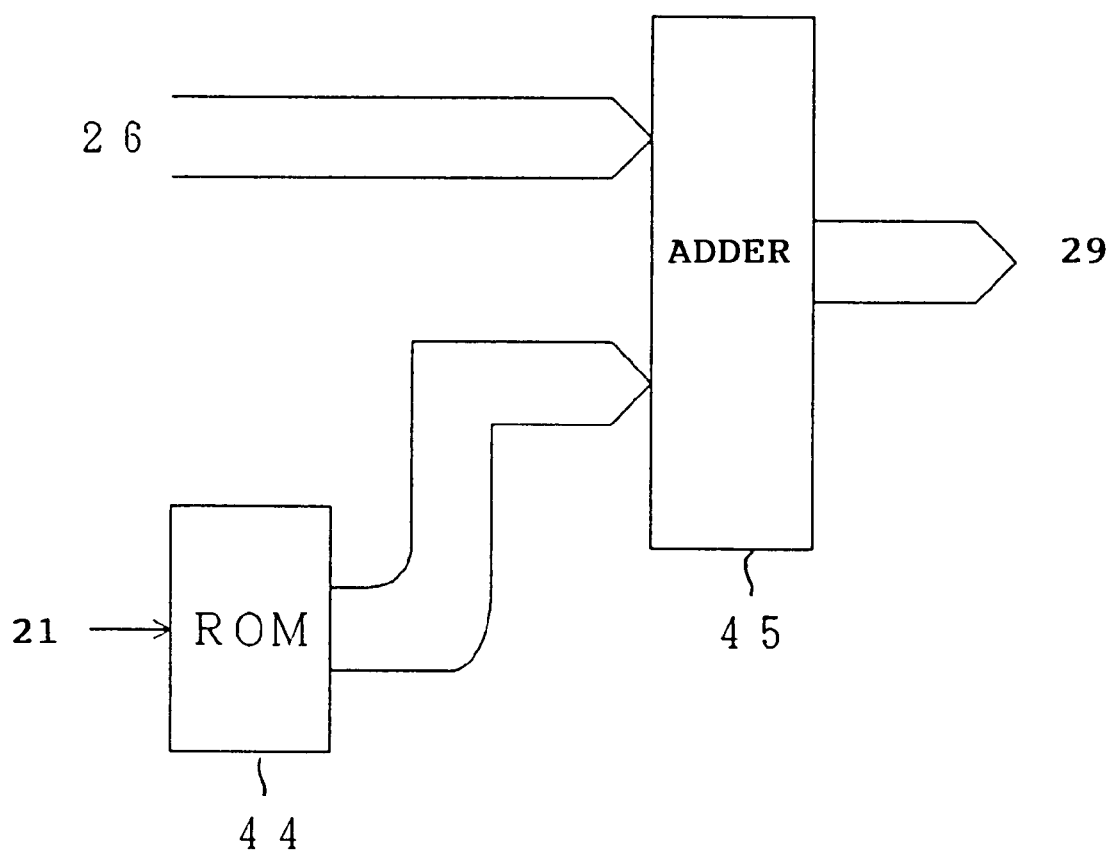
FIG. 13 shows a construction of a correcting circuit of the image processing unit according to the second embodiment.

FIG. 13 shows a schematic construction of the correcting circuit 43. The correcting circuit 43 includes a ROM 44 which stores corrected whiteness level data, and an adder 45 for adding the corrected whiteness level data from the ROM 44 to the whiteness level data from the A/D converter 26.

The ROM 44 is connected to the operation part 21 and outputs the corrected whiteness level data of different levels in the ADF mode and in the FB mode, the difference being in accordance with a reading mode switching operation at the operation part 21.

Accordingly, in the ADF mode, the ROM 44 outputs the corrected whiteness level data of a smaller level than in the FB mode.

The corrected whiteness level data output from the ROM 44 is supplied to the adder 45. The data obtained by the reading of the white reference plate 15 by the image detecting unit 13 is supplied to the AD converter 26. The reference whiteness level data output from the AD converter 26 is then supplied to the adder 45.

The adder 45 adds the corrected whiteness level data from the ROM 44 to the reference whiteness level data, and supplies a sum to the whiteness level controller 29. The whiteness level data output from the adder 45 is corrected to become the whiteness level data adapted to the reading condition. By setting the whiteness level according to the data output from the adder 45, it is possible to set the whiteness level in the ADF mode lower than that in the FB mode. Consequently, substantially the same image quality can be obtained irrespective of the reading mode.

Figure 14:
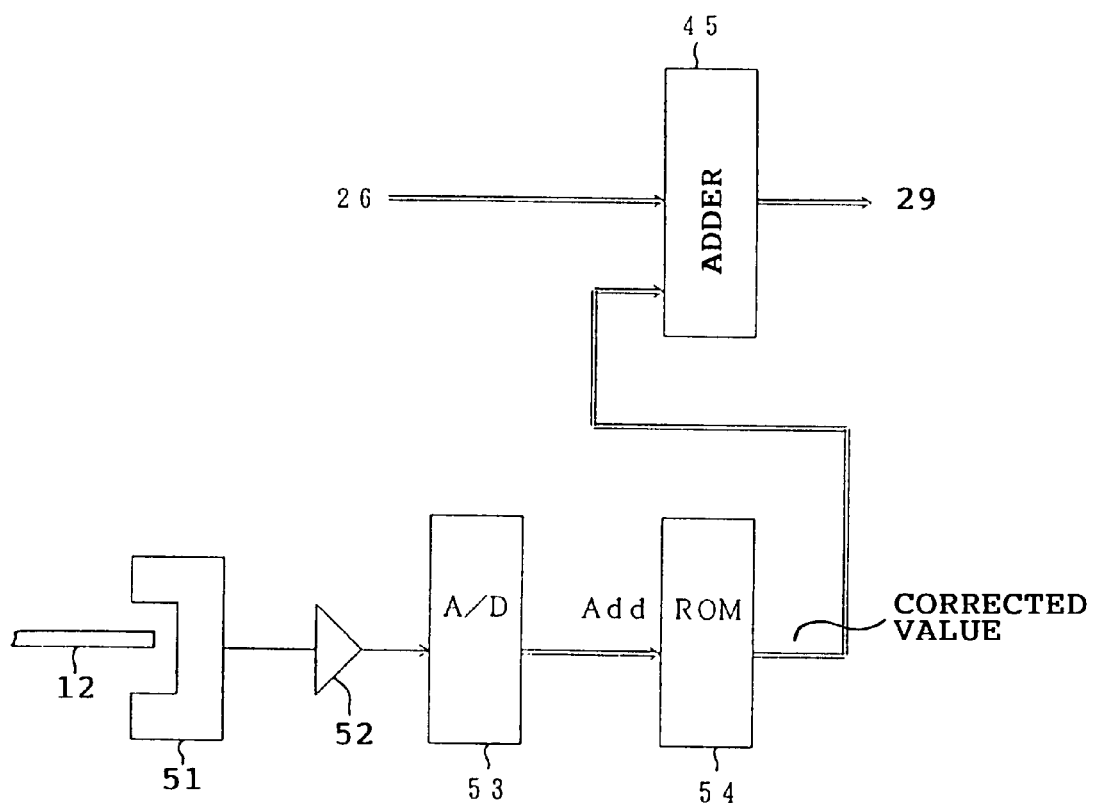
FIG. 14 shows a construction of a first variation of the correcting circuit according to the second embodiment.

FIG. 14 shows a construction of a first variation of the correcting circuit of the second embodiment. In FIG. 14, those components that are the same as the components of FIG. 13 are designated by the same reference numerals, and the description thereof is omitted.

The first variation is constructed such that the whiteness level data is corrected according to the thickness of the original 12. For example, this variation includes: a transparent-type photosensor 51 which, provided in a path through which the original 12 is transported, detects the thickness of the original 12; an amplifier 52 for amplifying an output signal of the photosensor 51; an A/D converter 53 for converting the output of the amplifier 52 into digital data; and a ROM 54 which, supplied with the digital data output from the A/D converter 53 as the address, supplies the corrected whiteness level data corresponding to the address to the adder 45.

Since the transparency of one original differs from that of another, the digital data commensurate with the thickness of the original 12 is obtained by detecting the transparency of the original 12 by the transparent-type photosensor 51, amplifying the detected signal and converting the same into digital data. By supplying the digital data commensurate with the thickness to the ROM 54 as the address, the corrected whiteness level data commensurate with the thickness can be retrieved from the ROM 54 and used in correcting the whiteness level. This variation is employed in the ADF reading mode. Since, in the ADF mode, the amount by which the original 12 is detached from the reading window varies depending on the thickness of the original 12, the whiteness level correction in accordance with this amount is conducted by detecting the thickness of the original 12.

Figure 15:
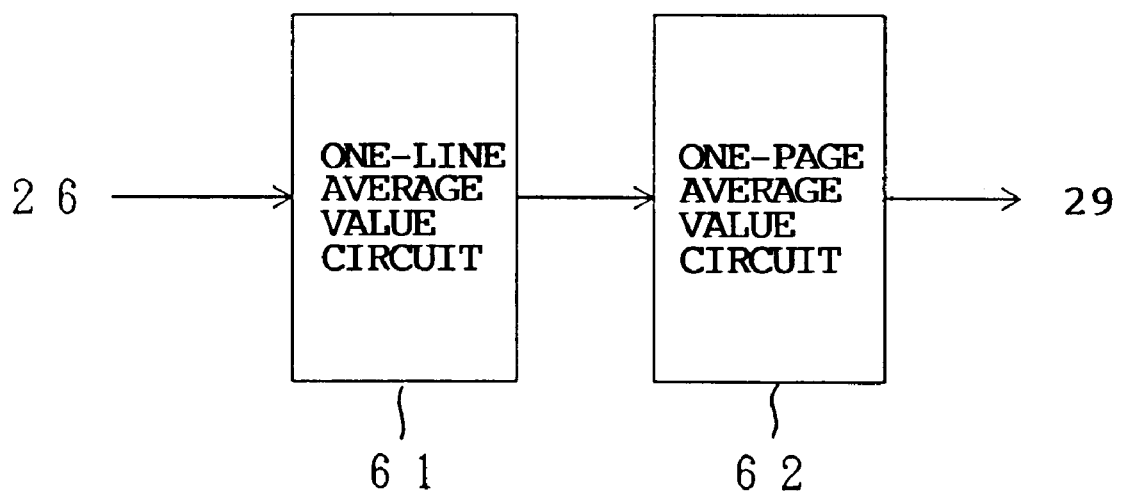
FIG. 15 shows a construction of a second variation of the correcting circuit according to the second embodiment.

FIG. 15 shows a schematic construction of a second variation of the correcting circuit of the second embodiment. The correcting circuit of the second variation is constructed such that reference whiteness level data is obtained by reading a blank sheet of the same kind as that used for the original 12.

The correcting circuit of the second variation includes: a one-line average value circuit 61 for calculating an average value of the image data for one line on the basis of the image data obtained by reading the blank sheet; and a one-page average value circuit 62 for calculating an average value of the image data for one page on the basis of the average value for lines calculated by the one-line average value circuit 61.

Figure 16:
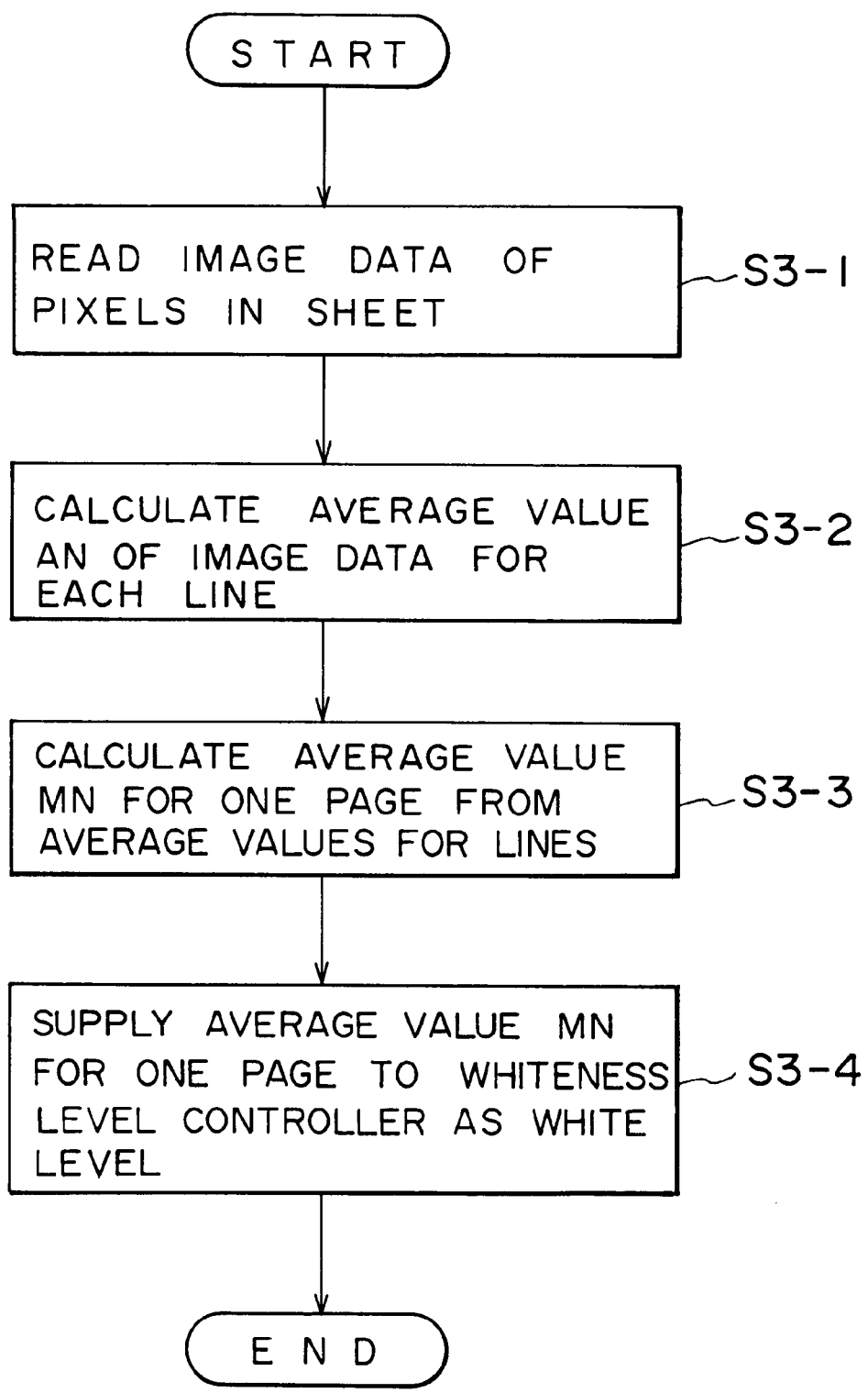
FIG. 16 is a flowchart which explains an operation of the second variation of the correcting circuit according to the second embodiment.

FIGS. 16 and 17 explains an operation of the second variation. Referring to FIG. 17, 63 indicates a blank sheet of the same kind as used for the original 12 to be read. Referring to FIG. 16, assuming that, pixels (1, 1)–(N, N) (column, row) totaling a number N times N in the sheet 63 are read (S3-1), the image data for the pixels (1, 1)–(N, N) is supplied to the one-line average value circuit 61, whereupon the image data values for the pixels are totaled, and a sum $A_1$ of the image data values for a first line is obtained. An average value M1 for the first line is calculated by dividing $A_1$ by the number of pixels N in one line, M1 being supplied to the one-page average value circuit 62 (S3-2).

The one-line average circuit 61 obtains average values A1–AN for the respective lines. The values A1–AN are successively supplied to the one-page average circuit 62. The one-page average value circuit 62 is supplied with the average values A1–AN for the respective lines by the one-line average value circuit 61, and calculates a sum ANN of the average values A1–AN. ANN is divided by the number of lines N contained in one page so as to obtain an average value MN for one page (S3-3).

The average value MN for one page obtained by the one-page average value circuit 62 is supplied to the whiteness level controller 29 as the reference whiteness level (S3-4).

According to this variation, it is possible to obtain the whiteness level specific to the type of sheet on which the image to be read is provided. Accordingly, a whiteness level suitable for each original can be obtained so that a high-quality image is obtained. As in the above described variation, by adding the correcting circuit 43 in the whiteness level generating circuit 27 of the first embodiment, additional effects can be achieved on top of the effects derived from the first embodiment. Thus, the whiteness level control can be performed more accurately, and images with higher quality can be obtained.

FIG. 18 shows a schematic construction of a third embodiment of the present invention. FIG. 19 shows a construction of an image processing unit according to the third embodiment. In the figures, those components that are the same as the components of FIGS. 11 and 12 are designated by the same reference numerals, and the description thereof is omitted.

In the third embodiment, not only whiteness level correction but blackness level correction is performed. The third embodiment differs from the second embodiment in that the construction of the image processing unit is modified, and a black reference plate 72 is provided. An image processing 71 of the third embodiment includes: the A/D converter 26; the whiteness level generating unit 42; and a blackness level generating unit 73.

The blackness level generating unit 73 has substantially the same construction as the whiteness level generating unit 42. The blackness level generating unit 73 includes: a blackness level determining unit 74 for comparing the video signal read by the image detecting unit 13 and supplied via the terminal $T_1$ with the blackness level signal generated in the blackness level generating unit 73 so as to determine whether or not the video signal corresponds to the blackness level; a blackness level controller 75 for generating reference blackness level data in accordance with the digital data output from the blackness level determining unit 74 and the A/D converter 26, and for causing the whiteness level to vary in correspondence with the comparison result supplied by the blackness level determining unit 74, thereby effecting a following operation; a blackness level memory 76 for storing the blackness level data generated by the blackness level controller 75; a whiteness level D/A converter 77 for converting the blackness level data generated by the blackness level controller 75 into an analog signal, generating an output whiteness level signal, and supplying the output whiteness level signal to the A/D converter 26 and the blackness level determining unit 74; and a correcting circuit 78 for correcting the digital data supplied from the A/D converter 26 to the blackness level controller 75.

The blackness level determining unit 74 is embodied, for example, by a converter, and compares the video signal supplied via the terminal $T_1$ with the output blackness signal. When it is determined that the video signal is smaller in level than the output blackness level signal, the blackness level determining unit 74 outputs a high-level blackness level follow signal and supplies the same to the blackness level controller 75. When it is determined that the video signal is greater in level than the output blackness level signal, the blackness level determining unit 74 outputs a low-level blackness level follow signal and supplies the same to the blackness level controller 75.

The blackness level controller 75 is embodied by a CPU etc. The blackness level controller 75 fixes the blackness level when the image such as a photograph is read. When a line drawing or the like is read, the blackness level controller 75 generates the follow blackness level data in accordance with the blackness level follow signal from the blackness level determining unit 74. The generated data is stored in the blackness level memory 76. The stored data is used as the blackness level data for the next line. The blackness level controller 75 lowers the level of the blackness level data by a predetermined number of steps when the blackness level follow signal is at a high level. The blackness level data is made to follow so as to ensure that the video signal is above the blackness level.

The blackness level memory 76 is embodied by a RAM or the like and stores the blackness level data for each pixel in a line.

FIG. 20 shows a construction of the correcting circuit 78. The correcting circuit 78 includes: a ROM 79 for storing corrected data; and an adder 80 for adding the corrected data from the ROM 79 to the blackness level data from the A/D converter 26.

The ROM 79 is connected to the operation part 21 and outputs the corrected data having different levels in the ADF mode and in the FB mode, the difference being in accordance with a reading mode switching operation at the operation part 21. For example, the corrected data of a smaller level is output from the ROM 44 in the ADF mode than in the FB mode.

The corrected data output from the ROM 79 is supplied to the adder 80. The data obtained by the reading of the black reference plate 72 by the image detecting unit 13 is supplied to the AD converter 26. The reference whiteness level data output from the AD converter 26 is then supplied to the adder 80.

The adder 80 adds the corrected whiteness level data from the ROM 79 to the reference blackness level data, and supplies a sum to the blackness level controller 75. The blackness level data output from the adder 80 is corrected to become the blackness level data adapted to the reading condition. By setting the blackness level according to the data output from the adder 80, substantially the same image quality can be obtained irrespective of the reading mode such as the ADF mode or the FB mode.

The present invention is not limited to the above described embodiments, and variations and modifications may be made without departing from the scope of the present invention.

What is claimed is:
1. An image reading apparatus comprising:
   an electrooptical converter, provided opposite an original having a front side and a back side, which scans the front side of the original and converts reflected light from the front side of the original, that is illuminated, into an analog electric signal;
   a backing member which has a plurality of colored areas used to create a white reference disposed in a direction in which said electrooptical converter scans the original, and is provided opposite said electrooptical converter so as to support the back side of said original, where only a single color area needs to be detected, as a selected one of the plurality of color areas is used to create a respective, specific white reference;
   a driving mechanism to move said electrooptical converter with respect to the backing member; and
   controlling means for selecting one of the colored areas of said backing member, depending on a type of the original, and controlling said driving mechanism so that said electrooptical converter faces the selected colored area.

2. The image reading apparatus as claimed in claim 1, further comprising:

converting means for converting said analog electric signal output by said electrooptical converter into digital data in accordance with a whiteness level indicating a maximum brightness; and a whiteness level following circuit which causes said whiteness level supplied to said converting means to follow the analog electric signal output from said electrooptical converter.

3. The image reading apparatus as claimed in claim 1, wherein said controlling means causes said electrooptical converter to read said backing member so as to detect a variation of a second electric signal along a direction in which said electrooptical converter lies, and controls, in response to an occurrence of the variation being greater than a predetermined level, the driving mechanism so as to move a position of said electrooptical converter with respect to said backing member.

4. The image reading apparatus as claimed in claim 2, wherein said controlling means causes said electrooptical converter to read said backing member so as to detect a variation of a second electric signal along a direction in which said electrooptical converter lies, and controls, in response to an occurrence of a variation being greater than a predetermined level, the driving mechanism so as to move a position of said electrooptical converter with respect to said backing member.

5. An image reading method using an image reading apparatus including an electrooptical converter provided opposite an original, a backing member having a plurality of colored areas used to create a white reference where only a single color area needs to be detected as a selected one of the plurality of color areas is used to create a respective, specific white reference, a driving mechanism for moving said electrooptical converter with respect to said backing member, and controlling means, said image reading method comprising the steps of:

selecting one of the colored areas of said backing member;

reading the selected colored areas by using said electrooptical converter;

altering a relative position of said original and said electrooptical converter; and reading said original.

6. An image reading method comprising the steps of:

scanning a front side of an original using an electrooptical converter and converting reflected light from the front side into an analog signal;

moving said electrooptical converter with respect to a backing member having a plurality of colored areas selectively used to create a white reference where only a single color area needs to be detected as a selected one of the plurality of color areas is used to create a respective, specific white reference; and selecting one of the colored areas of said backing member depending on a type of the original, and controlling a driving mechanism so that said electrooptical converter faces the selected colored area.

7. An image reading apparatus comprising:

an electrooptical converter for converting reflected light from an original that is illuminated into an electrical signal;

converting means for converting an analog electric signal obtained in said electrooptical converter into digital data in accordance with a whiteness level signal indicating a maximum brightness, reading of said original being conducted whole a relative position of said original and said electrooptical converter is being altered;

thickness detecting means for detecting a thickness of the original; and whiteness level correcting means for correcting a whiteness level to become a predetermined value in correspondence with the thickness, detected by said detecting means, of said original.

8. An image reading method comprising:

scanning a front side of an original using an electrooptical converter and converting reflected light from the front side into an analog signal;

moving said electrooptical converter with respect to a multi-colored backing member;

controlling the movement of said electrooptical converter in correspondence with a type of the original, and thereby controlling a position of said electrooptical converter with respect to said backing member so that said electrooptical converter faces a colored area of said backing member; and correcting a whiteness level to become lower in level as a thickness of the original increases.

9. An image reading method as claimed in claim 8, further comprising the step of setting the whiteness level at an average value of data obtained by causing said electrooptical converter to read a blank original.

10. An image reading apparatus having a first reading function wherein an original is illuminated and its image is read while said original is moved and an electrooptical converters, for converting reflected light into an electric signal, is fixed, and a second reading function wherein the original is illuminated and its image is read while said original is fixed and said electrooptical converter is moved, said image reading apparatus comprising;

whiteness level correcting means for correcting a whiteness level indicating a maximum brightness to have a predetermined value responsive to whether the first or second reading function is used.

11. An image reading method using an image reading apparatus including an electrooptical converter, comprising:

reading a backing member by using said electrooptical converter;

altering a relative position of an original and said electrooptical converter;

reading said original; and correcting a whiteness level to become greater in level when a first reading function is used in reading the original than when a second reading function is used.

12. An image reading apparatus having a first reading function wherein an original is illuminated and its image is read while said original is moved and an electrooptical converter, for converting reflected light into an electric signal, is fixed, and a second reading function wherein the original is illuminated and its image is read while said original is fixed and said electrooptical converter is moved, said image reading apparatus comprising:

converting means for converting an analog electric signal output from said electrooptical converter into digital data commensurate with a blackness level indicating a minimum brightness; and blackness level correcting means for correcting a blackness level to have a predetermined value responsive to whether the first or second reading function is used.

13. An image reading apparatus comprising:

an electrooptical converter which, provided opposite an original having a front side and a back side, scans the front side of the original and converts reflected light from the front side of the original that is illuminated into an analog electric signal;

a backing member having a plurality of colored areas used to create a white reference, disposed in a direction in which said electrooptical converter scans the original, and provided opposite said electrooptical converter so as to support the back side of said original, where only a single color area needs to be detected, as a selected one of the plurality of color areas is used to create a respective, specific white reference;

a driving mechanism to move said electrooptical converter with respect to the backing member; and a controller to select one of the colored areas of said backing member depending on a type of the original, and controlling said driving mechanism so that said electrooptical converter faces the selected colored area.

* * * * *

UNITED STATES PATENT AND TRADEMARK OFFICE
CERTIFICATE OF CORRECTION

PATENT NO.   : 6,301,019 B1
DATED        : October 9, 2001
INVENTOR(S)  : Keiichi Saito et al.

It is certified that error appears in the above-identified patent and that said Letters Patent is hereby corrected as shown below:

<u>Title page,</u>
Item [56], Foreign Patent References, insert:

-- 61-177069   08/1986   Japan
   03-070363   03/1991   Japan --

<u>Column 18,</u>
Line 36, change "converters" to -- converter --.

Signed and Sealed this

Nineteenth Day of March, 2002

Attest:

Attesting Officer

JAMES E. ROGAN
Director of the United States Patent and Trademark Office